(12) United States Patent
Ramsden et al.

(10) Patent No.: US 7,202,478 B2
(45) Date of Patent: Apr. 10, 2007

(54) GAMMA-RAY SPECTROMETRY

(75) Inventors: David Ramsden, Shirley (GB);
Ling-Jian Meng, Southampton (GB);
Oleg Ivanov, Moscow (RU); Sergei Ignatov, Moscow (RU)

(73) Assignee: Symetrica Limited, Hampshire (GB)

( * ) Notice: Subject to any disclaimer, the term of this patent is extended or adjusted under 35 U.S.C. 154(b) by 0 days.

(21) Appl. No.: 11/219,028

(22) Filed: Sep. 2, 2005

(65) Prior Publication Data
US 2006/0027754 A1  Feb. 9, 2006

Related U.S. Application Data

(63) Continuation of application No. 10/398,973, filed on Apr. 10, 2003, now Pat. No. 6,940,017.

(51) Int. Cl.
*G01T 1/20* (2006.01)
(52) U.S. Cl. .................................. 250/361 R
(58) Field of Classification Search ............. 250/361 R
See application file for complete search history.

(56) References Cited

U.S. PATENT DOCUMENTS

| | | | |
|---|---|---|---|
| 3,091,463 A | | 5/1963 | Gibson et al. |
| 3,752,986 A | | 8/1973 | Fletcher et al. |
| 4,345,153 A | * | 8/1982 | Yin ............................. 250/369 |
| 4,823,016 A | | 4/1989 | Yamashita et al. |
| 5,021,652 A | * | 6/1991 | Arnold ........................ 250/267 |
| 5,099,128 A | | 3/1992 | Stettner |
| 5,481,114 A | | 1/1996 | Daniel et al. |
| 6,492,641 B1 | | 12/2002 | Dep et al. |
| 6,521,894 B1 | | 2/2003 | Iwanczyk et al. |

FOREIGN PATENT DOCUMENTS

| | | | |
|---|---|---|---|
| DE | 2927780 | | 1/1981 |
| GB | 851310 | * | 10/1960 |
| GB | 1308135 | | 2/1973 |
| GB | 2056476 | | 7/1979 |

OTHER PUBLICATIONS

Meng, L. J., et al. "An inter-comparison of Three Spectral-Deconvolution Algorithms for Gamma-ray Spectroscopy" IEEE, (2000): 691-695.
Meng, L. J., et al. "An inter-comparison of Three Spectral-Deconvolution Algorithms for Gamma-ray Spectroscopy" IEEE Trans Nuclear Science, 47.4 (2000):1329-1336.
Rooney, B.D. et al. "Scintillation Light Yield Nonproportionality: Calculating Photon Response Using Measured Electron Response" IEEE Trans Nuclear Science, 44.3 (1997): 509-515.
Rowbottom, C. G., et al. "Determination of Cement Content of Cement Blends Using Gamma-Ray Spectroscopy" Cement and Concrete Research, 27.11 (1997): 1681-1690.
Evans, R. J., et al. "Design of a large-area CsI(Tl) photo-diode array-for explosives detection by neutron-activation gamma-ray spectroscopy" Nuclear Instruments and Methods in Physics Research, A422 (1999): 900-905.

* cited by examiner

*Primary Examiner*—David Porta
*Assistant Examiner*—Marcus Taningco
(74) *Attorney, Agent, or Firm*—O'Melveny & Myers LLP

(57) ABSTRACT

A scintillation spectrometer provides improved resolution by ensuring that photons generated by scintillation events occurring in different locations within the scintillation material generate similar light profiles on the photo-detector, thereby making the output signal less sensitive to the initial interaction site and enabling more effective de-convolution of raw data. This is achieved in different ways, such as by: limiting the exit window of the scintillation crystal, introducing a spacer between the scintillation crystal and the detector window, or providing a crystal that is longer than necessary to stop gamma rays.

32 Claims, 18 Drawing Sheets

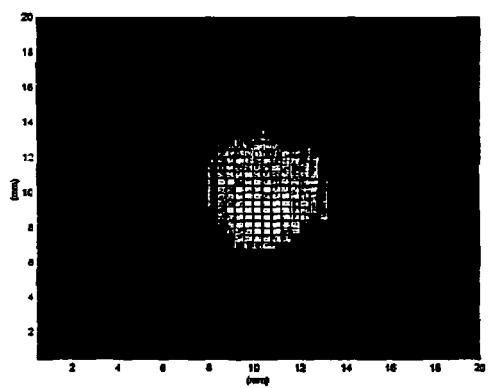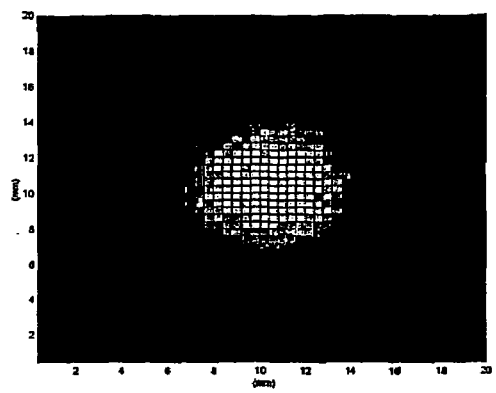
Fig. 10A                                Fig. 10B

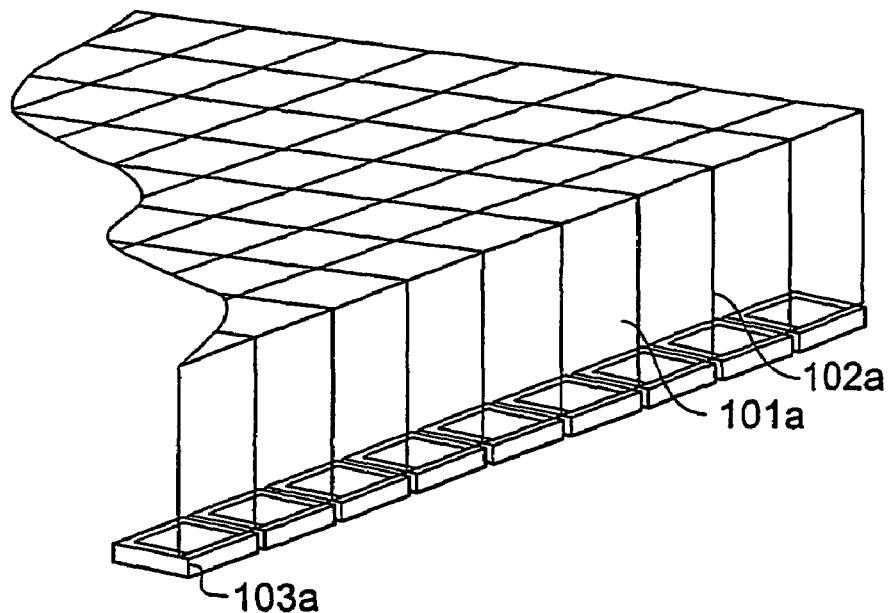
Fig. 17a
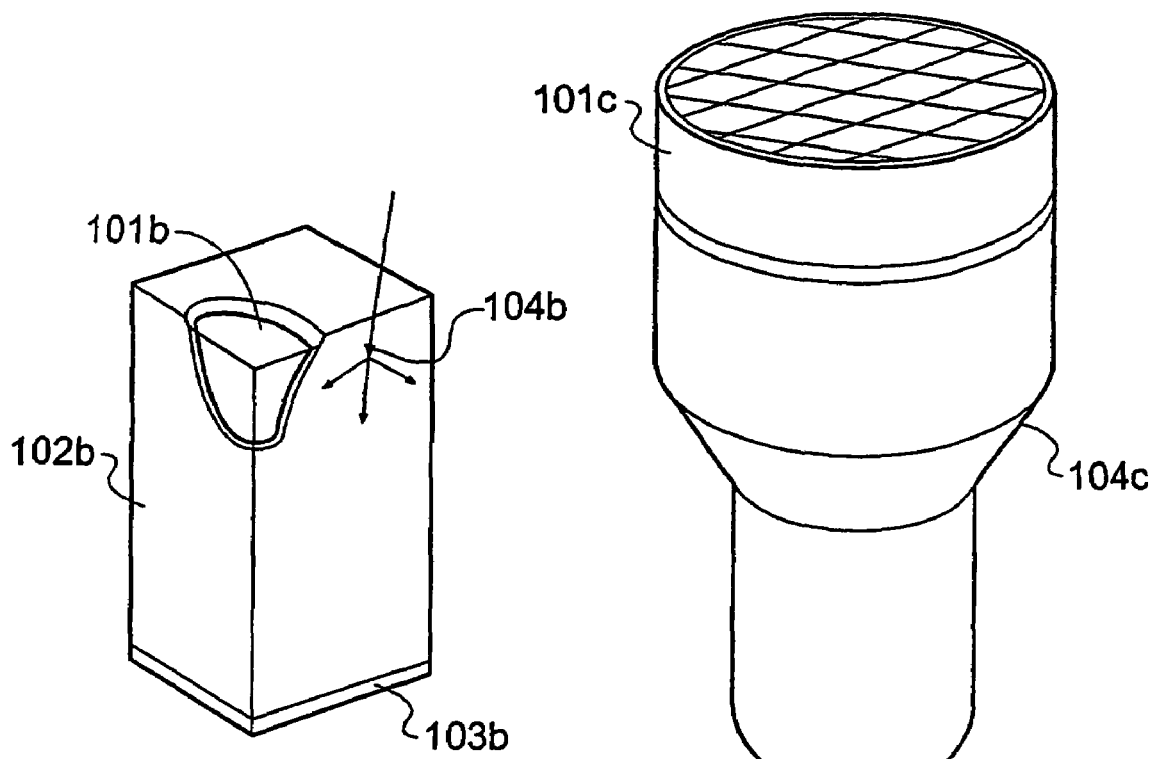
Fig. 17b
Fig. 17c

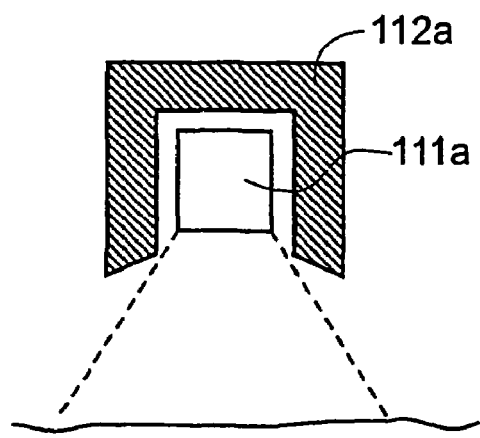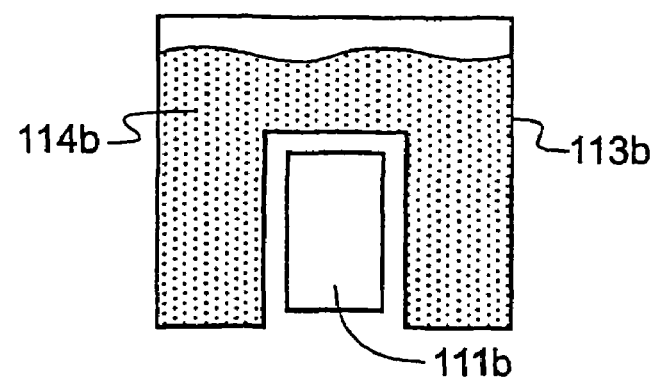
Fig. 18a　　　　Fig. 18b
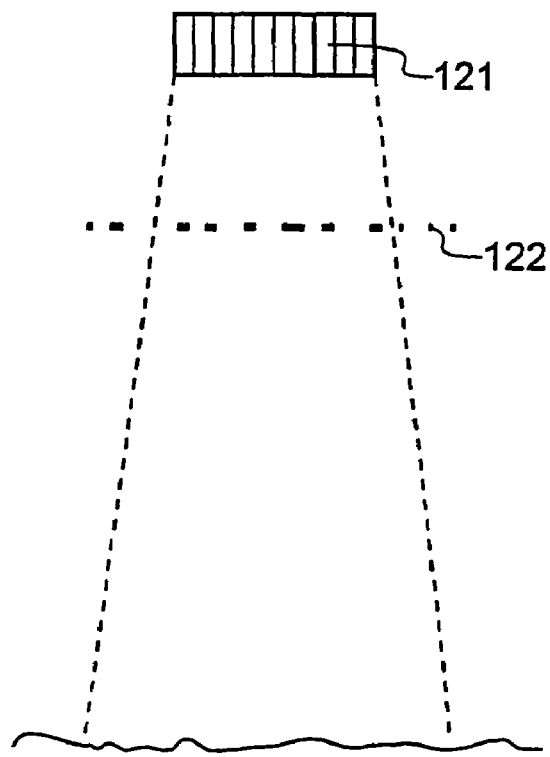
Fig. 19

GAMMA-RAY SPECTROMETRY

RELATED APPLICATION DATA

This patent application is a continuation of U.S. patent application Ser. No. 10/398,973, for GAMMA-RAY SPECTROMETRY, filed Apr. 10, 2003 now U.S. Pat. No. 6,940,017, which is incorporated herein by reference.

BACKGROUND ART

The invention relates to gamma-ray spectrometers, to systems employing gamma-ray spectrometers and to methods of gamma-ray spectroscopy.

Gamma-ray spectrometers are standard instruments used in a wide variety of scientific and industrial applications. Gamma-ray spectrometers are designed to absorb the energy of incident gamma rays and to convert the photon energy into an electronic signal proportional to the energy deposited in the detector. These instruments are used to quantify both the energy of the gamma rays produced by a source and their relative intensities. This information enables the user to determine the particular radioisotopes that are present and, for example, their relative concentrations. For many applications, it is important to be able to resolve gamma ray line-features even when they are grouped closely together. The other main performance characteristic is the stopping power of the spectrometer or its ability to absorb the gamma ray photons efficiently.

Two main types of gamma ray spectrometer are currently in use, hyper-pure germanium crystal spectrometers and scintillation spectrometers, each of which is now briefly described.

FIG. 1 of the accompanying drawings shows schematically a prior art hyper-pure germanium crystal (HPGe) spectrometer apparatus. The apparatus comprises a detector 1 housed in a detector capsule 2 attached to an arm 3 connected to a downwardly depending stick that is placed in a liquid nitrogen container 4. Germanium is a semiconductor having a relatively low band-gap and so has the advantage of generating one electron-hole pair, on average, for every 2.96 eV deposited in the crystal. This implies that for a full energy deposit of 1 MeV, the total number of charge carriers produced is of the order of 350,000. The statistical variance in such a signal is very small and so that this particular contribution to the achievable energy-resolution is typically only ~0.5% FWHM.

One of the disadvantages of the HPGe detector is that it can only function as a spectrometer if cooled to liquid-nitrogen temperatures, otherwise electrons can be thermally excited into the conduction-band and so generate a high level of noise. This means that an HPGe detector is neither compact nor rugged. The second disadvantage is that in order to provide a stopping power equivalent to a commonly available size of scintillation spectrometer, the germanium crystal becomes very expensive to fabricate. Nevertheless, such detectors are very widely used because of their unmatched spectral resolution.

FIG. 2 shows an example of a spectrum acquired using a HPGe spectrometer (lower trace), in which energy E in keV is plotted against number of counts C.

FIG. 3 shows an example of a scintillation spectrometer. The detector comprises a scintillation crystal 31 which scintillates when a gamma-ray is absorbed within it. The scintillation crystal is fabricated from a material having a high effective atomic number. The scintillation crystal is packed into a hermetically sealed body 33 with $Al_2O_3$ which acts as a reflective material and receives signal through a glass entrance window 34 situated on the upper end of the package. The scintillation crystal is arranged above a photo-multiplier tube 32 which is encased in a magnetic shield 35. As an alternative to a photo-multiplier tube, a PIN diode can be used. PIN diodes are experimentally advantageous in terms of size and ruggedness, but have not been widely used except in small scintillation counters in which the use of bulkier photomultiplier is inappropriate. This is because PIN diodes have relatively small sensitive detection areas and relatively high noise levels. A common crystal material used for the scintillation crystal is NaI(Tl), i.e. sodium iodide doped with a trace of thallium. In this material, an energy-loss of 1 MeV will generate ~38,000 photons in a narrow wavelength band centred on 415 nm. The sealed body 33 is needed, since NaI(Tl) material is very hygroscopic. In conventional scintillation spectrometers, these crystals are machined to form a cylinder having a diameter, for example 78 mm (3 inches) to match that of the photo-multiplier 32 as shown in the figure. The total dimensions of the detector package in the specific example are 82 mm maximum diameter and 146 mm height. The quantum-efficiency of photo-multipliers at the wavelength of interest, is typically 25% so the number of charge-carriers detected from a 1 MeV energy deposit is ~8,000. This assumes a light-collection efficiency of 85% in transferring the scintillation light to the photo-cathode. The achievable spectral-resolution is clearly then much poorer than that of the HPGe sensor since the statistical contribution to the resolution is worse than 2.75% at 1 MeV.

FIG. 2 (upper trace) shows a typical energy-loss spectrum recorded using an industry-standard 78 mm (3 inch) NaI(Tl) spectrometer when illuminated by a Co-60 source. The contrast in performance with the HPGe detector (lower trace) is very clear.

The energy-resolution of a scintillation spectrometer is significantly worse than that predicted by photon-statistics alone. The additional degrading effects are a consequence of several factors. A first effect is the variance in the scintillation efficiency of the crystal itself, which is energy dependent and cannot be corrected for simply. A second effect is the non-uniformity of the response of the photo-cathode. A third effect is the variance in the light-collection efficiency of the crystal and photo-multiplier assembly for events that occur in different locations within the detector crystal.

For any given field of use, the performance limitations of scintillation spectrometers need to be compared with the experimental limitations of HPGe spectrometers. Clearly, a gamma-ray spectrometer combining the advantages of both types of prior art device would be highly desirable. For example, if one could improve the energy-resolution of scintillation spectrometers, there would be many applications of these devices for which there would otherwise be no other alternative but to use the more expensive and fragile HPGe spectrometers.

Deconvolution is a well known technique used in spectroscopy and other diverse fields, in which a raw data spectrum obtained with a detection system is deconvolved with a response function representing the response of the detection system to known input signals.

Since deconvolution is based on computing the incident spectrum from the energy-loss data and the detector energy-response function, its success is dependent on accurately defining the detector energy-response function, which is not a trivial problem.

Generally, the observed spectrum O(E) can be represented by the integral:

$$O(E) = \int_0^\infty R(E, E_0) \cdot I(E_0) \cdot dE_0 \quad (1)$$

where the l(E) is the incident spectrum, and $R(E,E_0)$ is the detector response function. This equation can be discretised as:

$$\begin{bmatrix} O_1 \\ . \\ . \\ . \\ O_m \end{bmatrix} = \begin{bmatrix} R_{11} & R_{12} & \cdots & R_{1n} \\ . & & \cdots & . \\ . & & \cdots & . \\ . & & \cdots & . \\ R_{m1} & R_{m2} & \cdots & R_{mn} \end{bmatrix} \times \begin{bmatrix} I_1 \\ . \\ . \\ . \\ I_n \end{bmatrix} + \begin{bmatrix} \varepsilon_1 \\ . \\ . \\ . \\ \varepsilon_m \end{bmatrix} \quad (2)$$

Here the term $\epsilon_i$ (i=1, ..., m) is the noise contribution and $R_{ij}$ is the probability that an incident gamma-ray, having an energy falling into bin i, will be detected in bin j. An important task has been to identify the most appropriate method to use in order to predict the incident spectra, given the observed energy-loss spectra and the errors on those spectra.

The response matrix R for a standard 78 mm (3 inch) NaI(Tl) detector can be predicted, in part, by computing how the gamma ray photons interact in the particular scintillation material and for the particular dimensions selected for that spectrometer. This may be accomplished using, for example, the GEANT code developed by CERN.

This response of such a detector was calculated at 3 keV energy intervals over the range from zero to 3072 keV assuming that the gamma-ray source was located at a point 10 cm on-axis, above the top of the detector. An extra programme was then used to represent the broadening of the spectrum expected as a consequence of the optical photon-statistics, based on the known light-yield of the material chosen. A curve may then be fitted to the experimental data in order to represent the way that the energy-resolution varies as a function of the incident photon energy. The effectiveness of the various mathematical methods that are available for use in solving this inverse problem have been reviewed in reference [1].

FIG. 4A shows, as an example, a raw energy-loss spectrum collected with a standard 78 mm (3 inch) NaI(Tl) detector illuminated by a Ra-226 source, the graph plotting counts C against energy E in keV. FIG. 4B is the equivalent graph of the deconvolved result. Not only has the spectral-resolution been markedly improved by the deconvolution, but the accurate repositioning of the Compton-scattered events back into the full-energy peak has resulted in an improvement of the detector sensitivity by a factor of about four at 1 MeV.

Although spectral deconvolution techniques are clearly very successful in improving the results taken with scintillation detectors, the achievable improvement is limited and the quality of data taken with HPGe detectors is still far superior.

SUMMARY OF THE INVENTION

The invention has resulted from taking a holistic design view of the data collection (by the spectrometer) and its subsequent processing (by deconvolution). The inventors have systematically analysed the effect that the nature of the spectrometer has on the deconvolution of the raw energy-loss spectrum. Through this analysis, the inventors have identified the fact that spectrometer design influences how good the deconvolution can be. More specifically, the inventors have quantified the limitation on the energy resolution achievable after deconvolution that is attributable to existing spectrometer designs. Moving on from that, the inventors have been able to design several new scintillation spectrometers which allow the deconvolution process to achieve a better energy resolution in the processed data than is possible with conventional scintillation spectrometer designs.

The invention can thus be viewed as being based on a new principle in which the design of the scintillation spectrometer is based on optimising how effectively the raw-energy loss data can be treated by the subsequent deconvolution. This contrasts with the conventional design principle of concentrating on improving the energy resolution and the signal strength of the raw-energy loss data collected by the scintillation spectrometer.

One recognition of the invention is that the scintillation spectrometer should be designed having regard to its response function, and the ease of modelling its response function, since it is the characteristics of the device's response function, and how accurately it can be modelled, that determine the degree to which the raw energy-loss spectra can be enhanced by the deconvolution process.

The technical teaching of the invention may be expressed by stating that the device design should take a holistic view, in which the deconvolution process is taken as an integral part of the design in combination with the physical design of the gamma-ray spectrometer itself.

The invention was arrived at from the following analysis of the resolution limits of a conventional 78 mm (3 inch) NaI(Tl) scintillation detector. The results of the analysis are shown in Table 1. The overall resolution $R_{overall}$ is shown in the right-hand column, and its components, as determined by the modelling process, in the three middle columns. Each row of the table shows the results for different gamma-ray energies. The components are the calculated statistical noise $R_{statistic}$, the calculated intrinsic noise of the scintillation material $R_{intrinsic}$ and a residual component $R_{residual}$ obtained from subtracting the statistical and intrinsic contributions from the calculated overall resolution value $R_{overall}$.

TABLE 1

Contributions to the Energy-resolution of the 78 mm (3 inch) NaI Detector

| Energy | $R_{statistic}$[1] | $R_{residual}(R_{transfer})^2$ | $R_{intrinsic}$ | $R_{overall}$ |
|---|---|---|---|---|
| 80 keV($^{133}$Ba) | 10% | 5.5% | 3.7% | 12% |
| 121 keV($^{152}$Eu) | 7.7% | — | 4.3% | ~9.5% |
| 244 keV($^{152}$Eu) | 5.5% | — | 4.9% | ~8.9% |
| 356 keV($^{133}$Ba) | 4.8% | 6.5% | 4.6% | 9.3% |
| 511 keV | 4.0% | 6.8% | 5.6% | 9.7% |
| 662 keV | 3.5% | 6.9% | 4.6% | 9.0% |
| 1.274 keV | 2.5% | 6.2% | 3.5% | 7.5% |
| 2.22 MeV | 1.9% | 5.4% | 3.0% | 6.5% |
| 4 MeV | 1.4% | ~5%[3] | 1.9% | 5.5% |
| 6 MeV | 1.2% | ~5% | 1.5% | 5.4% |
| 8 MeV | 1.0% | ~5% | 1.0% | 5.2% |

The Gaussian contribution was calculated for a light-yield of 4500 electrons/662 keV.

The three contributions to the resolution limit are now discussed in turn.

The contribution $R_{intrinsic}$ arises from the intrinsic variance in the light output from the scintillation material. Each scintillation material has its own characteristic response when irradiated by electrons having different energies [2]. As a consequence, one may combine the information from the GEANT modelling exercise to estimate the spread in the light that one would expect to be generated by the electrons produced in the crystal by the Photo-electric, Compton and Pair-creation processes.

The contribution $R_{statistic}$ arises from the statistical noise associated with the photon creation process. For spectrometers based on photo-multipliers, the statistical noise contribution is very small and so can be neglected. However, it does become a major contribution to the spectral-resolution of scintillation spectrometers below 1 MeV when a photo-diode is used to read-out the signal.

The contribution $R_{residual}$ is the focus of the present design considerations. This contribution is a catch-all contribution that was estimated by comparing the observed spectral-resolution R measured at a number of different energies and progressively removing the other contributions that are easier to model. The intuition of the inventors was that the contribution $R_{residual}$ arose from limitations in the detector transfer or response function as now explained, hence the alternative labelling of this term as $R_{transfer}$ in the table. It is known that the response of the sensitive area of the photo-multiplier tube, its photo-cathode, varies such that a gamma-ray absorption event occurring close to the entrance window of the photo-multiplier (i.e. nearest to the photo-cathode) will generate a significantly different signal than an identical event occurring near the top of the scintillation crystal farthest from the photo-cathode (see FIG. 3A for reference). Since the photo-cathode spatial response is variable from tube to tube, this effect cannot be modelled satisfactorily, leading to inaccuracy in calculating the response function to be used for the deconvolution.

The conclusion of the inventors was that the scintillation detector should be redesigned to reduce this variance by ensuring that, as far as possible, no matter where the primary gamma-ray absorption event occurred in the scintillation crystal, the detector response should be the same. This conclusion can be expressed by two design rules:
the path between gamma-ray absorption and detector sensitive area should be large
the detector sensitive area should have a uniform response across its area.

According to a first aspect of the invention there is provided a gamma-ray spectrometer comprising a scintillation body for receiving gamma-rays and creating photons therefrom, and a photon detector having a sensitive area facing the scintillation body so as to receive and detect the photons, wherein the sensitive area of the photon detector presented to receive the photons is no more than 10% of the surface area of the scintillation body.

By making the photodetector small in comparison with the size of the scintillation body, the path lengths between gamma-ray absorption and photon incidence on the photo-detector can be made more equal through the promotion of multiple scattering, for example by multiple reflections from the outer surface of the scintillation body. The proportion of light that reaches the photodetector directly can thus be made small, with only scintillation events occurring in a small fraction of the volume of the scintillation body in the immediate vicinity of the photodetector resulting in direct transfer of light from the scintillation event location to the photodetector.

Reducing the relative size of the photo-detector in this way thus serves to make the light profile at the photo-detector invariant with the position of initial gamma-ray interaction in the scintillation body. This is counter-intuitive, since the usual prior art approach is to make the photo-detector sensitive area as large as possible to increase the signal. Typically, in the prior art, the photo-detector sensitive area is made to extend across as large a proportion as possible of the scintillation body area We advocate the opposite approach for the reasons explained above.

It will be understood that the sensitive area of the photo-detector may be larger than the sensitive area presented to receive the photons. This will be the case if, for example, an aperture or small exit window is placed in front of a photo-cathode of a photomultiplier tube to ensure that photons are only incident on a restricted central area of the photocathode which has greater response uniformity.

The sensitive area is preferably between 1% and 10%, more preferably 1% and 5%, of the surface area of the scintillation body.

The scintillation body may have at least a portion of its surface which is curved, for example arcuately curved. The sensitive area of the photodetector can then be arranged generally tangentially to the curved surface portion. In one embodiment, the scintillation body is generally spherical. Deviations from a sphere could be used, including a wide variety of generally rounded or ovoid bodies or bodies with rounded surface parts. The advantage of adhering as closely as possible to a spherical shape is that such a shape is amenable to accurate modelling, resulting in accurate determination of the response function used in the post-detection deconvolution process. As described above, this will improve the accuracy and resolution of the data.

According to a second aspect of the invention there is provided a gamma-ray spectrometer comprising a gamma-ray spectrometer comprising a scintillation body for absorbing gamma-rays at locations within the scintillation body and creating photons therefrom, and a photon detector arranged to receive and detect the photons, wherein the photon detector is separated from the scintillation body by a light guiding spacer dimensioned to spread the photons so that their intensity profile across the photon detector is relatively invariant to the locations where the gamma rays are absorbed in the scintillation body.

Inclusion of a light guiding spacer serves to make the light profile at the photo-detector invariant with the position of initial gamma-ray interaction in the scintillation body. This thus represents an alternative way of achieving the same result as achieved in the first aspect of the invention. This is counter-intuitive, since the prior art approach would be to maximise the signal by maximising the photon flux incident on the photodetector. The approach of arranging a relatively thick loss-inducing spacer between scintillation body and photodetector would therefore not be taken.

It will be understood that the first and second aspects of the invention are compatible and can be combined in a single device. For example, a light-guiding spacer may be arranged between a small-area photodetector and the surface of a scintillation body.

In implementations of the second aspect of the invention, the length of the light guiding spacer may be at least 0.3, 0.4 or 0.5 times the width of the scintillation body, and the length of the light guiding spacer may be no more than 1, 2, 4, 6, 8 and 10 times the width of the scintillation body. More generally, the length of the spacer should be chosen so that the light profile at the photo-detector is relatively invariant with the position of initial gamma-ray interaction in the scintillation body, whether the initial gamma-ray interaction occurs immediately adjacent to the spacer or farthest away from the spacer.

The light-guiding spacer is advantageously packed in a reflective material.

In the first or second aspects of the invention, the scintillation body is advantageously packed in a reflective material.

According to a third aspect of the invention there is provided a gamma-ray spectrometer comprising a scintillation body for absorbing gamma-rays of at least a first energy at locations within the scintillation body and creating photons therefrom, and a photon detector arranged to receive and detect the photons, wherein the scintillation body is dimensioned to have a length of at least twice the attenuation length of gamma rays of the at least first energy in the scintillation body, so as to spread the photons so that their intensity profile across the photon detector is relatively invariant to the locations where the gamma rays are absorbed in the scintillation body.

By making the scintillation body longer than is necessary to stop the incident gamma-rays of interest, the light profile incident on the photo-detector is made invariant with the position of initial gamma-ray interaction in the scintillation body. This is counter-intuitive, since the usual prior art approach is to make the scintillation body no longer than is necessary to stop all the gamma rays. In the prior art, it would be viewed as undesirable to make the scintillation body longer than necessary to absorb the gamma rays of interest, since this will induce signal losses as a result of the "roll-off" (i.e. photon signal decay through escape of photons out of the scintillation body and other processes). In other words, making the scintillation body longer than the attenuation length of the gamma rays of interest will result in fewer photons reaching the photodetector. However, the teaching of the present invention makes it clear that it is more important to ensure that the photodetector response is the same no matter where the initial gamma ray absorption occurs than to maximise the signal by maximising the number of photons incident upon the photodetector.

The third aspect of the invention is particularly suited for array spectrometers in which the scintillation body comprises an array of pillars. The pillars of the array are preferably laterally isolated from each other with reflective material. The photon detector advantageously comprises an array of detection elements, preferably matched to the pillars. The array of detection elements is made of an array of discrete photodiodes, a monolithic array of photodiodes, a multi-pixel hybrid photodiode, or an electron-bombarded charged coupled detector (CCD).

For imaging applications, the spectrometer may further comprise a coded-aperture mask, collimator, pin hole or other imaging device arranged before the scintillation body to allow for imaging using an array of detection elements.

A further aspect of the invention relates to a method of gamma-ray spectroscopy comprising: providing an object to be analysed based on gamma rays, and collecting energy-loss data for the object with a gamma-ray spectrometer comprising a scintillation body for receiving gamma-rays and creating photons therefrom, and a photon detector having a sensitive area facing the scintillation body so as to receive and detect the photons, wherein the sensitive area of the photon detector presented to receive the photons is no more than 10% of the surface area of the scintillation body.

A still further aspect of the invention relates to a method of gamma-ray spectroscopy comprising: providing an object to be analysed based on gamma rays, and collecting energy-loss data for the object with a gamma-ray spectrometer comprising a scintillation body for absorbing gamma-rays and creating photons therefrom, and a photon detector arranged to receive and detect the photons, wherein the photon detector is separated from the scintillation body by a light guiding spacer dimensioned to spread the photons so that they more uniformly illuminate the photon detector.

Another aspect of the invention relates to a method of gamma-ray spectroscopy comprising: providing an object to be analysed based on gamma rays of at least a first energy, and collecting energy-loss data for the object with a gamma-ray spectrometer comprising a scintillation body for absorbing the gamma-rays and creating photons therefrom, and a photon detector arranged to receive and detect the photons, wherein the scintillation body is dimensioned to have a length of at least twice the attenuation length of gamma rays of the at least first energy in the scintillation body, so as to spread the photons so that they more uniformly illuminate the photon detector.

The collected energy-loss data can then be processed by deconvolution using a response function computed for the gamma-ray spectrometer. The processing may automatically compensate for temperature effects, if the energy-loss data is collected with temperature data indicating the scintillation body temperature.

In the above aspects of the invention, the photon detector is advantageously based on a semiconductor element, such as a PIN diode, since these can be made with a very uniform sensitivity across their sensitive area. In specific examples, the photon detector may be a PIN diode, a drift diode, a hybrid photodiode (HPD) or an avalanche photodiode (APD). Alternatively, the photon detector is a photo-multiplier tube (PMT). To improve uniformity of response the PMT may be specially selected, or only a restricted area of the photo-cathode presented to receive photons. For example, the restricted area may be a central portion of the photo-cathode over which the response variation is relatively small.

The gamma-ray spectrometers of the above aspects of the invention offer the possibility of using gamma-ray spectrometry for a variety of existing and new applications, such as:

for determining radioactivity levels in a soil sample, in an airborne apparatus for mapping radioactivity levels, for determining radioactivity levels in a liquid sample, such as aqueous effluent, in a cooling circuit of a nuclear reactor for detecting presence of one or more fission products in the cooling circuit, for measuring elemental composition of crushed rock by irradiating the crushed rock with neutrons and detecting gamma rays emitted as a consequence, for verifying the elemental composition of cement before firing by irradiating the cement with neutrons and detecting gamma rays emitted as a consequence, for measuring the calorific content of coal by irradiating the coal with neutrons and detecting gamma rays emitted as a consequence, for detecting radioactive material passing through a detection archway or baggage control apparatus, or contained in a shipping container, for detecting explosives passing through a detection archway or baggage control apparatus, or contained in a shipping container, for detecting narcotics passing through a detection archway or baggage control apparatus, or contained in a shipping container, for detecting buried landmines by illuminating the ground with neutrons and detecting gamma rays emitted as a consequence, for detecting and imaging contraband materials using multi-energy gamma-ray computed tomography (MEGA-CT), for analysis of the U/th ratio in rock chippings generated during drilling of an oil well, for rock composition analysis by down-the-well neutron analysis, for rock core analysis, for radio guided surgery, in a gamma ray imaging system for imaging radioactive tracers a patient, for thickness measurements with a monochromatic beam of gamma rays, for measuring the cement content of concrete from the natural radioactivity levels in the constituents, for measuring the water content of concrete by illuminating the concrete with neutrons.

These applications are described in more detail further below.

BRIEF DESCRIPTION OF THE DRAWINGS

For a better understanding of the invention and to show how the same may be carried into effect reference is now made by way of example to the accompanying drawings in which:

FIG. 10A is a schematic representation of the modelled intensity distribution at the output of the scintillation crystal shown in FIG. 9 in response to a gamma-ray interaction at site P8;

FIG. 10B is a schematic representation of the modelled intensity distribution at the output of the scintillation crystal shown in FIG. 9 in response to a gamma-ray interaction at site P1;

FIG. 17A is a schematic perspective view of a scintillation spectrometer according to a first example of a third embodiment of the present invention;

FIG. 17B is a schematic perspective view further detailing an individual cell within the spectrometer of FIG. 17A;

FIG. 17C is a schematic perspective view of a second example of a third embodiment of the present invention;

FIG. 18A is a schematic section of a first example of a first application of an embodiment of the invention;

FIG. 18B is a schematic section of a second example of a first application of an embodiment of the invention;

FIG. 19 is a schematic section of a first example of a second application of an embodiment of the invention;

DETAILED DESCRIPTION

1. First Embodiment

Figure 1:
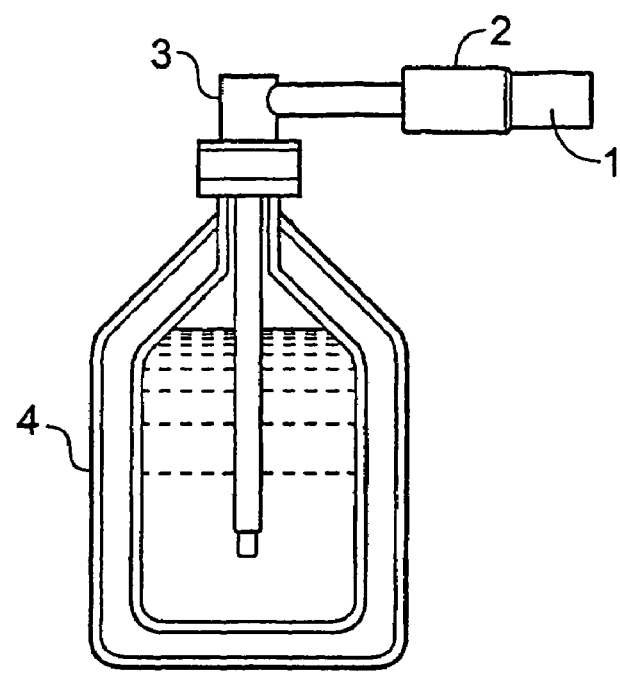
FIG. 1 is a schematic perspective view of a section of a prior art hyper-pure germanium crystal (HPGe) spectrometer system.
Figure 2:
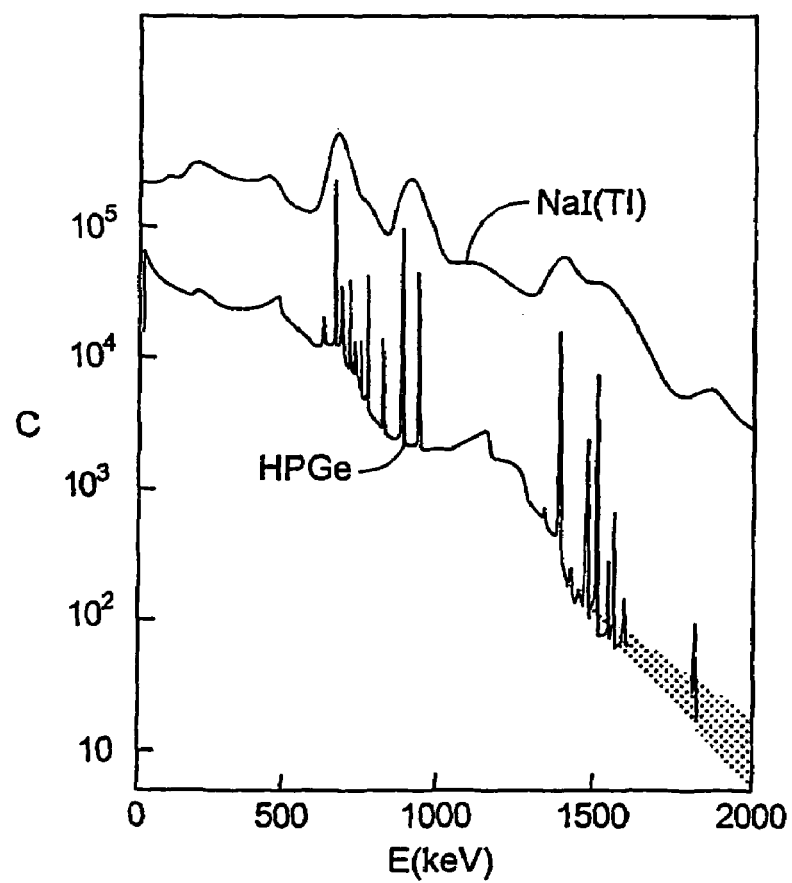
FIG. 2 is a graph of a typical spectrum recorded with an HPGe spectrometer and a prior art NaI(Tl) scintillation spectrometer.
Figure 3:
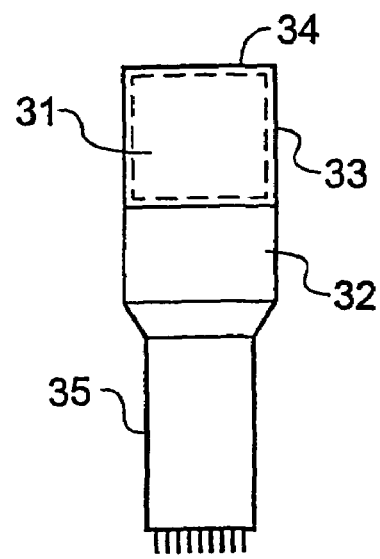
FIG. 3 is a schematic section view of a prior art NaI(Tl) scintillation spectrometer.
Figure 5:
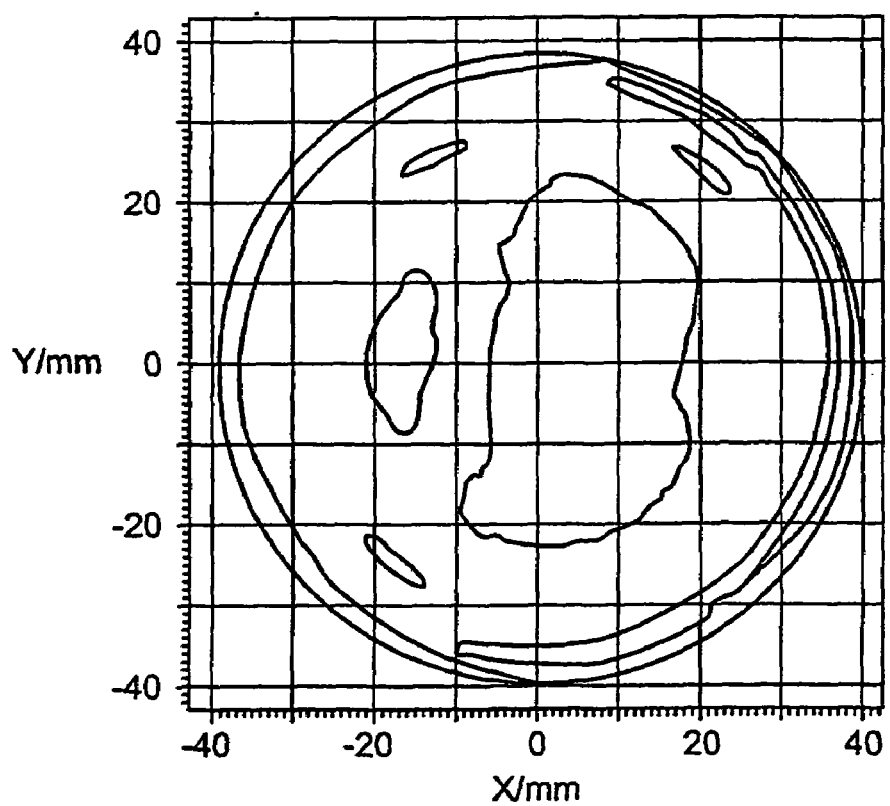
FIG. 5 is a contour graph of a typical spatial response map across the photo-cathode of a photo-multiplier tube.
Figure 4A:
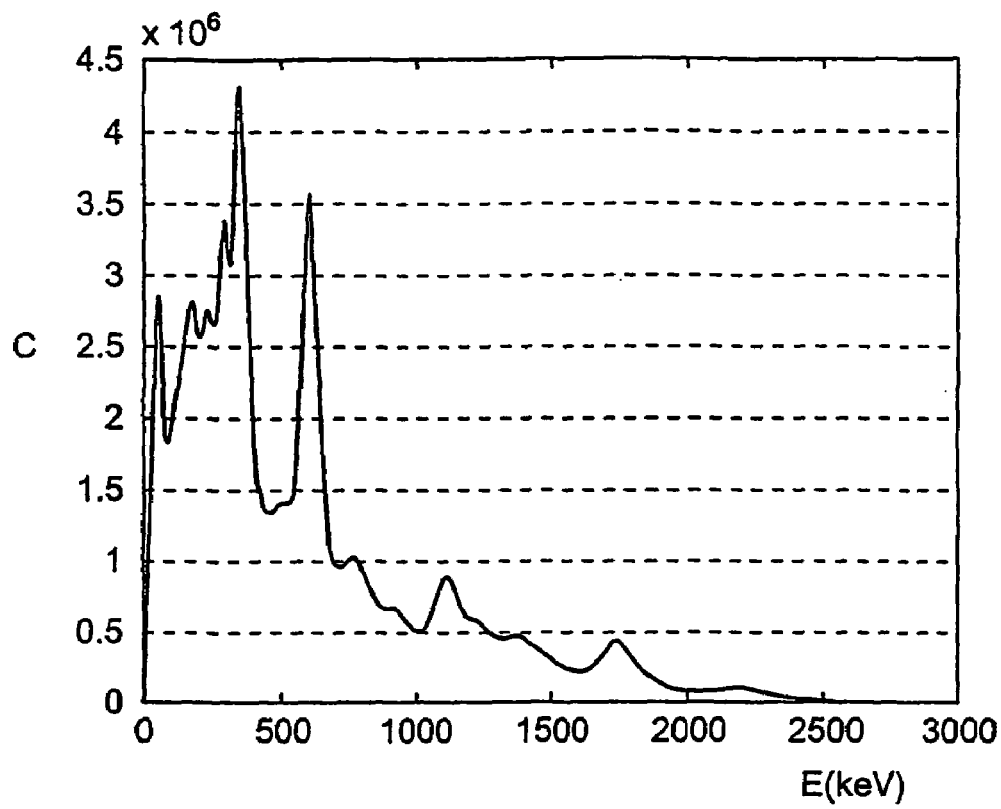
FIG. 4A is a graph of a typical spectrum recorded with a prior art NaI(Tl) scintillation spectrometer.
Figure 4B:
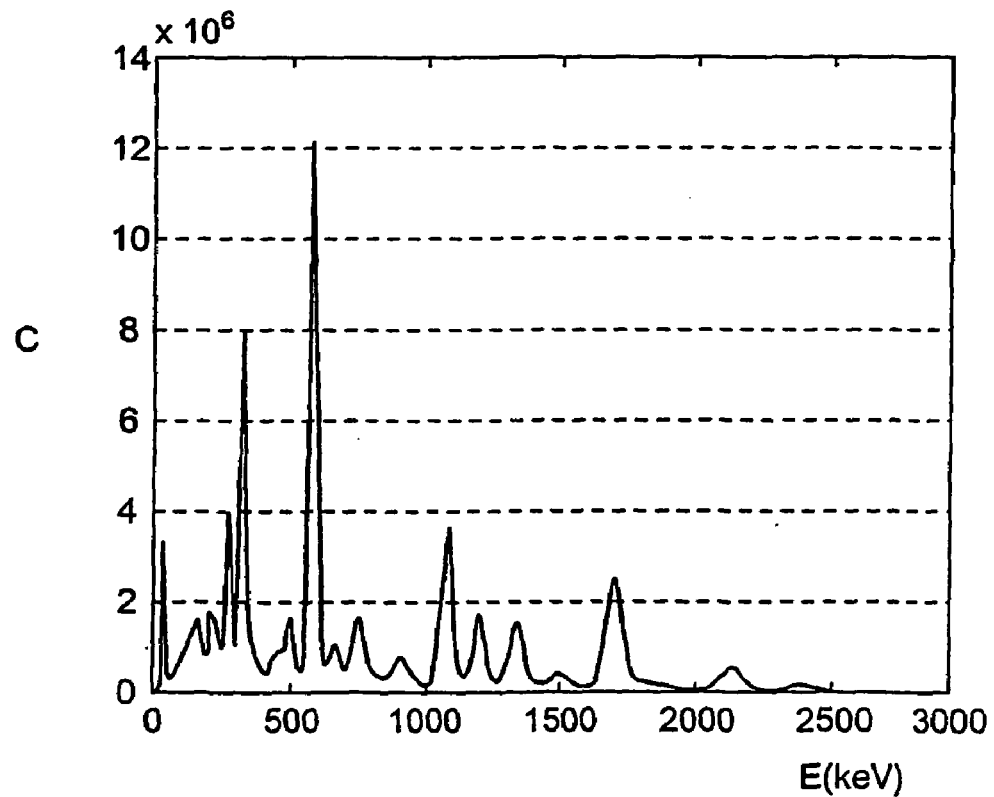
FIG. 4B is a graph of a deconvolved spectrum recorded with a prior art NaI(Tl) scintillation spectrometer.

The analysis outlined above highlighted the potential benefits of minimising the variances in the light-collection efficiency and spatial response of the photo-detector used. Both of these effects can be minimised by using a high quality PIN photodiode in place of a photo-multiplier. Although PIN photodiodes have a smaller sensitive area than that of the photo-multipliers used in current spectrometer designs, they have a very uniform response.

In order to minimise the variances in collecting the scintillation light at the photo-detector, a spherical scintillation crystal was chosen with a dimension that the area of the PIN diode would be typically only 1% of the surface area of the crystal. It was believed that, provided a high-reflectivity packing material was selected, a sufficiently high light-collection efficiency would, nevertheless, be achieved. Simulations and measurements suggest that the ratio of the detector area to that of the surface area of the detector, should not exceed a limit of 5%. At this limit some degradation in performance is already noticeable, as a result of the variance in path length between generation of the scintillation light and its collection by the photo-detector as a function of scintillation event position is reduced.

A number of optical Monte Carlo simulations were made to model the propagation of the scintillation light within the crystal sphere for different values of the reflection coefficient of the packing material and for different values of the ratio of the PIN diode area to the total surface area of the detector. This work indicated that even when the ratio of areas was as low as 1%, the light-collection efficiency was high and varied by typically less that 1% for 95% of the volume in a 100 cc detector.

Three prototype scintillation sphere detectors were constructed to validate these predictions. The volumes of these spheres varied between 20 cc, 100 cc and 300 cc, referred to as the S20-, S100- and S300-PIN spectrometers in the following. The three prototypes all used a 10×10 mm PIN diode to detect the signal. These devices provided a good range of spectrometer sizes that could provide stopping powers equivalent to those provided by the standard scintillation spectrometers that are currently on the market. By calculating the photon response using measured electron response it was possible to confirm that, for the S100-PIN spectrometer, a light-collection efficiency of 43% had been achieved, whilst for the S300-PIN device, the light-collection efficiency of 22% had been achieved. A comparison between the observational data and the modelled response of these spectrometers, enabled the contributions to the variance in the detected signals to be estimated. This data is summarised for one of the detectors, the S100-PIN scintillation sphere spectrometer, in Table 2.

Whilst the unprocessed spectral-resolution of this detector may be seen to be superior to that of a 78 mm (3 inch) NaI(Tl) detector having a similar stopping power, by comparing Tables 1 and 2, the real advantage of the scintillation sphere spectrometer design became more apparent after deconvolving the energy-loss spectra.

Figure 6:
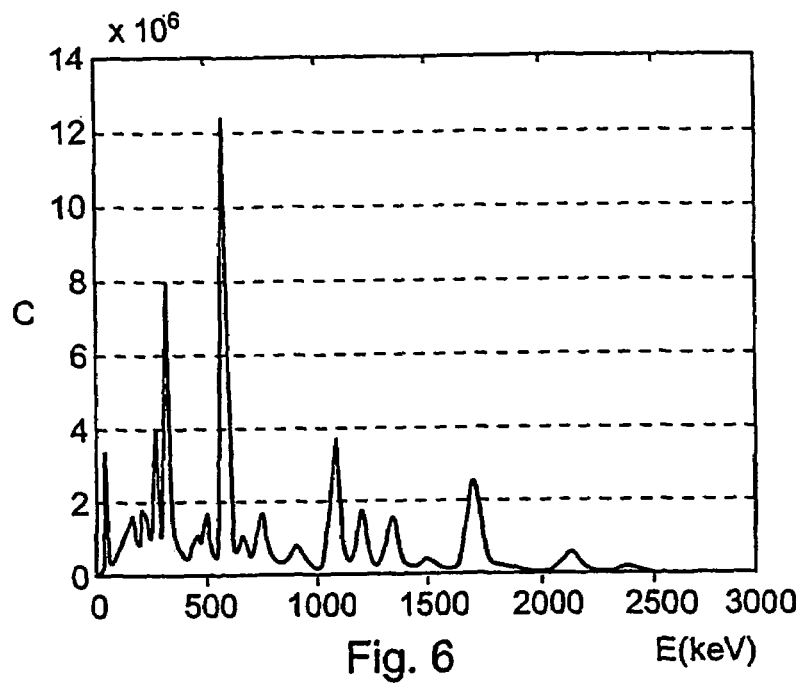
FIG. 6 is a graph of a typical deconvolved spectrum recorded with a prior art NaI scintillation spectrometer.
Figure 7:
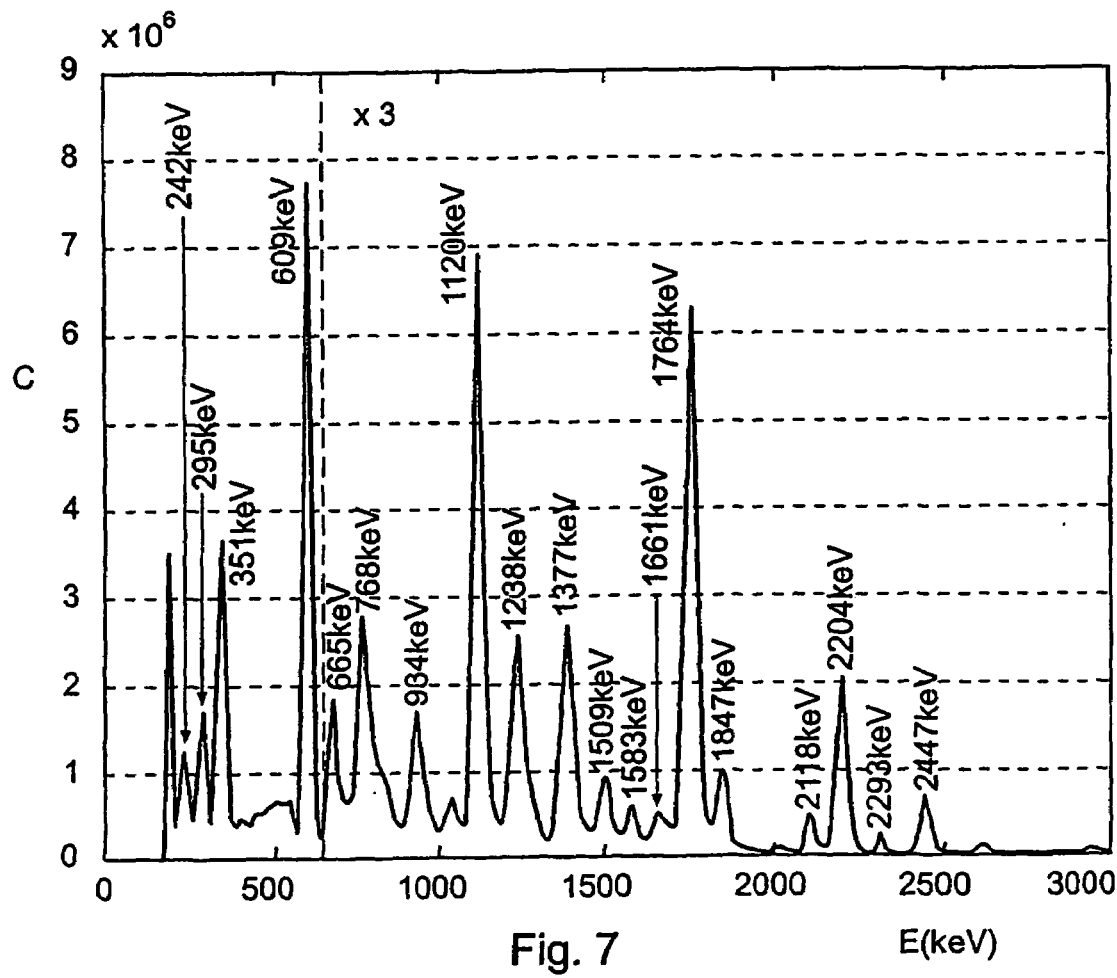
FIG. 7 is a graph of a typical deconvolved spectrum recorded with a CsI scintillation spectrometer according to an example of a first embodiment of the present invention.

FIGS. 6 and 7 compare deconvolved spectra acquired using a prior art 78 mm (3 inch) NaI(Tl) scintillation spectrometer and our S100-PIN spectrometer with the same gamma-ray source. The superior performance of our S100-PIN spectrometer is self evident.

TABLE 2

Energy-resolutions for the 100 cc CsI Detector

| Energy | $R_{noise}$[1] | $R_{statistic}$[2] | $R_{LCE}$ | $R_{intrinsic}$ | $R_{overall}$ (estimated) | $R_{overall}$ (measured) |
|---|---|---|---|---|---|---|
| 100 keV | 42% | 5.3% | 1.5% | 4.0% | 42.5% | |
| 150 keV | 28% | 4.3% | 1.5% | 3.6% | 28.4% | |
| 200 keV | 21% | 3.7% | 1.5% | 3.2% | 21.6% | |
| 250 keV | 16.8% | 3.3% | 1.5% | 4.5% | 17.8% | |
| 300 keV | 14% | 3.0% | 1.5% | 5.5% | 15.4% | |
| 356 keV | 12% | 2.8% | 1.5% | 5.3% | 13.5% | 13.4% |
| 400 keV | 10.5% | 2.6% | 1.5% | 5.2% | 12.1% | |
| 450 keV | 9.3% | 2.5% | 1.5% | 4.9% | 10.9% | |
| 511 keV | 8.2% | 2.3% | 1.5% | 4.4% | 9.7% | 9.5% |
| 662 keV | 6.3% | 2.0% | 1.5% | 3.8% | 7.7% | 7.7% |
| 1.274 keV | 3.3% | 1.4% | 1.5% | 2.2% | 4.5% | 4.7% |
| 2.22 MeV | 1.9% | 1.1% | 1.5% | 1.45% | 3.0% | 2.7~3.2% |
| 4 MeV | 1.05% | 0.83% | 1.5% | 1.2% | 2.3% | |
| 6.13 MeV | 0.7% | 0.68% | 1.5% | 0.97% | 2.0% | 2.0% |
| 8 MeV | 0.53% | 0.59% | 1.5% | 0.76% | 1.86% | |

[1]The value of the noise contribution was measured by irradiating the PD with an Am241 source. The measured value for the noise equivalent charge (NEC) was ~800 electrons.
[2]The Gaussian contribution was estimated by assuming 23 electrons/keV.

From Table 2 it can be seen that for energies below ~1 MeV, the resolution of the S100-PIN device is dominated by the contribution from electronic noise. This suggested that alternative read-out strategies could provide benefits.

One alternative is to use a large-area avalanche photodiodes diode (LAAPD).

Another alternative is to use a special photo-multiplier tube (PMT) that has a more uniform photo-cathode response than a standard PMT.

Both of these alternative readout devices provide some amplification of the charge generated by the optical photons collected by these detectors. This enables one to reduce the noise contribution that is inevitable when using a PIN diode. New spectrometers have been constructed using both APDs and PMTs. In the latter case, a new PMT design was selected that has a hemispherical entrance window. Only a limited region of the photo-cathode was used. This was in the expectation that the quantum efficiency would be most uniform in that central region. However, alternative designs have since been simulated that are based on the use of a small central area of a more conventional planar PMT. These seem to offer equivalent benefits.

Figure 8A:
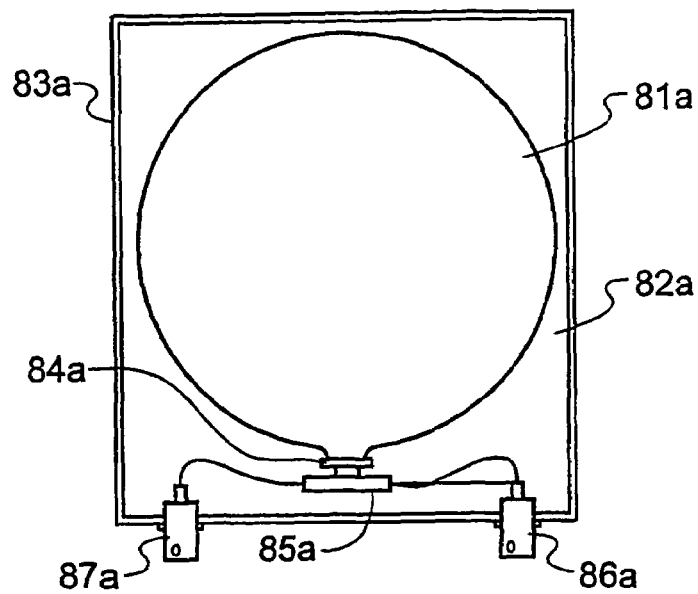
FIG. 8A is a schematic section view of a scintillation spectrometer according to a first example of a first embodiment of the present invention.

FIG. 8A shows a scintillation sphere spectrometer according to a first example. The spectrometer comprises a spherical scintillation crystal 81a that may be fabricated using one of a variety of materials, for example, CsI(Tl) CsI(Na), or BGO etc. The size of this sphere 81a may be chosen to suit the requirements of the particular application in order to provide an adequate stopping power to make an efficient detector. However, for optimum performance, the surface area of the sphere 81a should be much larger than the area of the exit 'window' to the photo-detector (>20:1). The optical finish of the spherical surface is important, and varies according to the physical properties of the scintillation crystal. For CsI(Tl), the optimum performance has been achieved by initially polishing the surface and then lightly abrading it The sphere 81a should be packed in highly reflective material 82a, such as MgO powder or PTFE tape. Other materials can also be used. The sphere 81a may be locally adapted to match either a short square, or circular extension 84a in order to couple a PIN detector or avalanche photodiode detector 85a to the sphere 81a using an appropriate optical glue. It is preferable to directly couple the PIN diode to the bias circuit and pre-amplifier. This may be integrated within the detector assembly. Signal and bias connectors 87a, 86a are used to connect the scintillation sphere spectrometer to signal processing electronics (not shown) which may be implemented using a PC, DSP or other hardware. The crystal assembly is housed within a light aluminium case 83a that is both light-tight and moisture-proof.

The advantages of the scintillation sphere spectrometer can also be achieved using a photo-multiplier for the readout rather than a silicon photo-diode. In this case, it is important to maintain the ratio of crystal surface-area to photo-cathode area, as large as possible, say 25:1 in the case of the S300-PMT scintillation sphere spectrometer. This provides a reasonable compromise between the contributions to the spectral-resolution by the variance in the number of photoelectrons collected and the variance expected in the light-collection efficiency when interactions occur in different locations within the sphere.

Figures 8B, 8C:
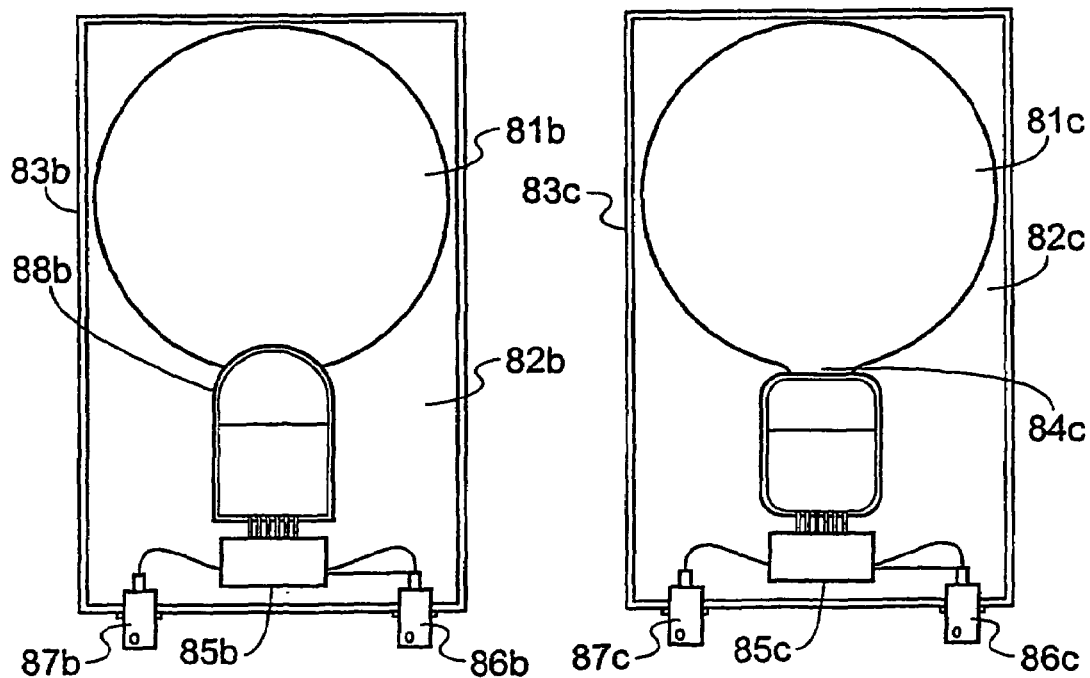
FIG. 8B is a schematic section view of a scintillation spectrometer according to a second example of a first embodiment of the present invention.
FIG. 8C is a schematic section view of a scintillation spectrometer according to a third example of a first embodiment of the present invention.

FIG. 8B is a second example of a scintillation sphere spectrometer according to the first embodiment. A scintillator crystal 81b, packing material 82b and a housing 83b are provided, as will be understood from the corresponding items discussed above in connection with FIG. 8A. A photo-multiplier assembly 85b contains a hemispherical head 88b which is partially immersed in the scintillation crystal 81b. Power supply and signal connectors 87b and 87c connect the scintillation sphere spectrometer with external electronics (not shown) for processing the signal.

FIG. 8C is a third example of the first embodiment. A scintillator crystal 81c, packing material 82c, a housing 83c, a coupling 84c and connections 87b, 86b are provided, as will be understood from the corresponding items discussed above in connection with FIG. 8A. A photo-multiplier assembly 85c is provided which is generally of conventional design, but arranged so that only a central region of the light sensitive area is exposed in order to reduce variance of the sensitivity across the exposed area.

2. Second Embodiment

A key advantage of the scintillation sphere spectrometer design of the first embodiment is its ability to minimise the variance in the light-collection efficiency when gamma rays interact in different regions of the crystal. This characteristic was also aided by the use of a photo-detector that has a very uniform spatial-response. The experience gained in the design, simulation and measurement of the performance of the scintillation sphere spectrometer devices, suggested the exploration of a simpler design based on the use of a prismatic detection crystal coupled to a similar, prismatic light-guide. This material will act as an efficient light-guide provided that its surface is highly reflective. The purpose of introducing this light guide was to ensure that the profile of the light-pool intensity incident upon the photo-multiplier was invariant with all the different possible locations for the interaction of gamma rays in the detection crystal. The addition of a light guide provides a design which enables one to use the full diameter of conventional photo-multipliers, thus giving a very simple construction that is compatible with existing standard scintillation crystals and PMTs. A number of optical simulations were carried out in order to establish the value of this concept, as now described.

Several optical Monte Carlo simulations were made to determine the light distribution at the exit plane of a cylindrical scintillation crystal. The crystal is assumed to be CsI surrounded by an efficient MgO powder reflector. From earlier work the reflectivity of this material was found to be as high as 99.7%. The light distribution over the exit plane of a CsI crystal was predicted for different gamma-ray interaction positions. These simulation were then repeated following the introduction of a light-guide between the crystal and the photo-multiplier and the expected light output distribution and the total light flux that is incident on the photo-cathode of a PMT is predicted. The diameter of the PMT is assumed to be equal to the diameter of the crystal. The effects of the length of the light-guide on these parameters and the effect of reducing the reflectivity of the material surrounding the scintillation crystal and light-guide are also discussed below.

Figure 9:
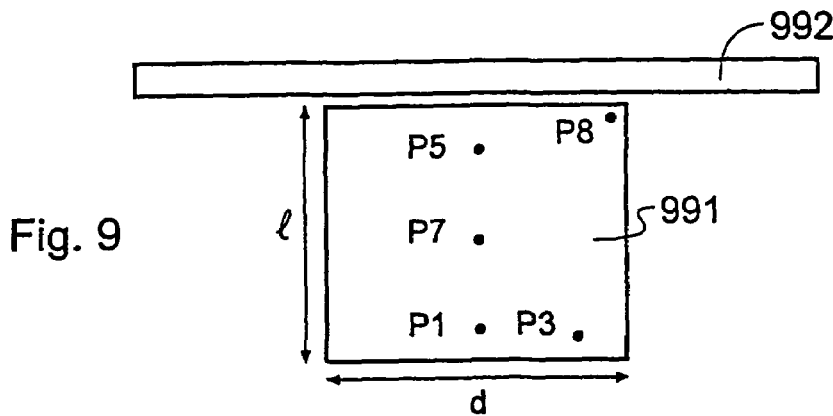
FIG. 9 is a schematic section view of a scintillation spectrometer according to a prior art configuration with a number of gamma-ray interaction sites P1, P3, P5, P7 and P8 marked.

The modelled light output is first determined for the crystal shown in FIG. 9. The model used consists of a cylinder of scintillating crystal 991, whose diameter d, was equal to its length, l. This crystal is optically coupled to a large glass window 992.

Point-sources of light were generated at different positions within the crystal to simulate scintillation events occurring when gamma-rays interact with the crystal at specific locations. The positions used are indicated in FIG. 9 and labelled P1, P3, P5, P7 and P8.

The light distribution at the output of the crystal was then mapped. In this case, the light intensity varies by <2% with the various position of interaction within the crystal. However, the distribution of the light over the exit plane does vary significantly. This is demonstrated in FIG. 10A and FIG. 10B, which represent the modelled intensity distribution at the exit plane for events occurring at the positions labelled P8 and P1 in FIG. 9 respectively. The position of the centroid of the light-pool varies by up to 5% for different interaction positions within the crystal. It may be noted that when the interaction position in the crystal is remote from the exit window, the light is much more evenly distributed across the exit plane.

Figure 11:
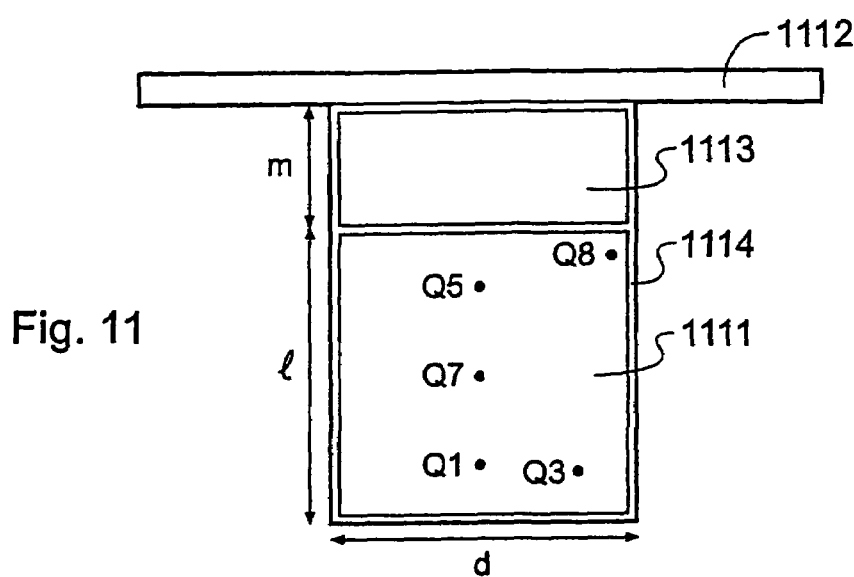
FIG. 11 is a schematic section view of a first example of a scintillation spectrometer according to a first example of a second embodiment of the present invention.

The observations made above suggest that by ensuring that no gamma-ray interactions occur close to the exit plane, the distribution of light at this exit will be spread more uniformly over the exit window. This can be achieved by placing a light-guide made of a non-scintillating material between the exit of the crystal and the window of the photo-multiplier. Such an arrangement is shown in FIG. 11, the scintillating material 1111 is separated from the large glass exit window 1112 by an optical spacer 1113 of length m.

In this model, both the light-guide 1113 and the crystal 1111 are surrounded by MgO powder 1114 as a high performance reflector. Polishing the light guide 1113 so that Total Internal Reflection (TIR) becomes important increased the light-collection efficiency. Again, point-sources of light were generated at different positions within the crystal to simulate scintillation events occurring when gamma-rays interact with the crystal at these locations. The positions used are indicated in FIG. 11 and labelled Q1, Q3, Q5, Q7 and Q8. By using a light-guide 1113 with a length m which is equal to the diameter d of the crystal 1111, the sensitivity of the light output distribution over the exit window to the location of interaction, was greatly reduced. In this case the centroid of the light pool varied by <0.5% compared to 5% value predicted for the crystal coupled to the PMT without a light-guide. The variance of the light pool about the centroid position was also calculated and for the crystal alone it varied by up to 20%. However, with the light guide in place, the variance changed by <5%.

Figure 12:
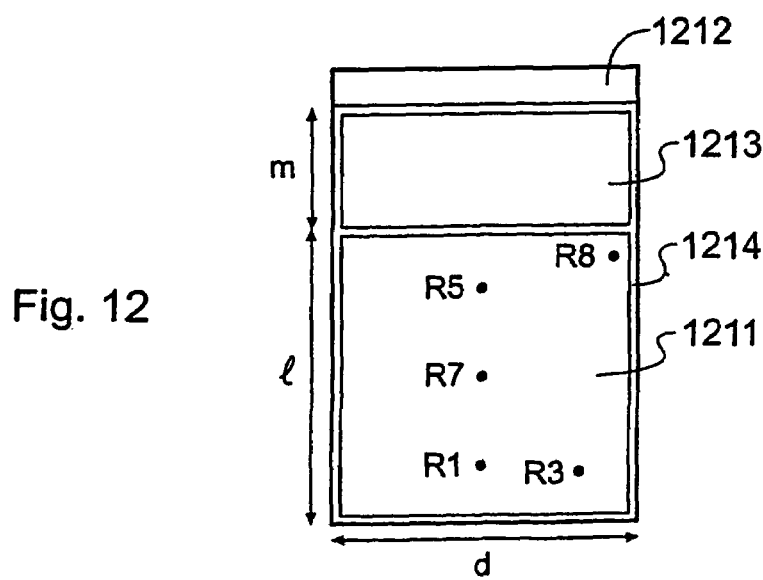
FIG. 12 is a schematic section view of a second example of a scintillation spectrometer according to a second embodiment of the present invention with a spacer of thickness m.

The next set of simulations investigated how changing the length of the light-guide and the reflectivity of the surrounding surface affected the light-collection efficiency. In these simulations, the aperture at the exit window was limited to the diameter of the crystal which was equal to that of the active area of the photo-cathode. A schematic example of such an arrangement is shown in FIG. 12. A light guide 1211 of length m optically couples a scintillation crystal of diameter d to an exit window 1212. As described above the crystal 1211 and light guide 1213 are packed in MgO powder 1214. Again, point-sources of light were generated at different positions within the crystal to simulate scintillation events occurring when gamma-rays interact with the crystal at these locations. The positions used are indicated in FIG. 12 and labelled R1, R3, R5, R7 and R8.

Figure 13A:
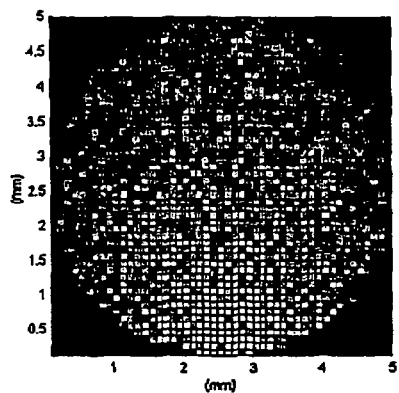
FIG. 13A is a schematic representation of the modelled intensity distribution at the output of the scintillation crystal of FIG. 12 with spacer thickness m=0 in response to a gamma-ray interaction site R8.
Figure 13C:
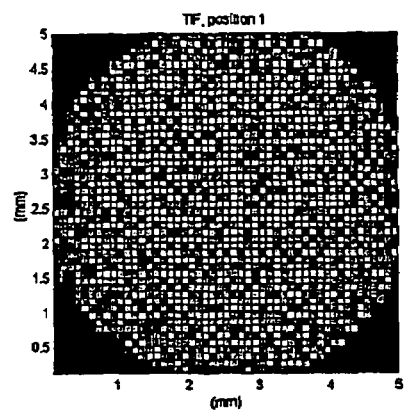
FIG. 13C is a schematic representation of the modelled intensity distribution at the output of the scintillation crystal of FIG. 12 with finite spacer thickness in response to a gamma-ray interaction site R8.
Figure 13B:
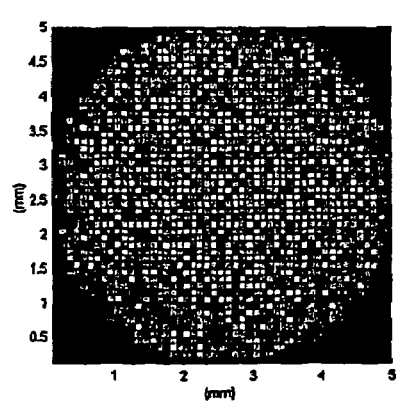
FIG. 13B is a schematic representation of the modelled intensity distribution at the output of the scintillation crystal of FIG. 12 with spacer thickness m=0 in response to a gamma-ray interaction site R1.
Figure 13D:
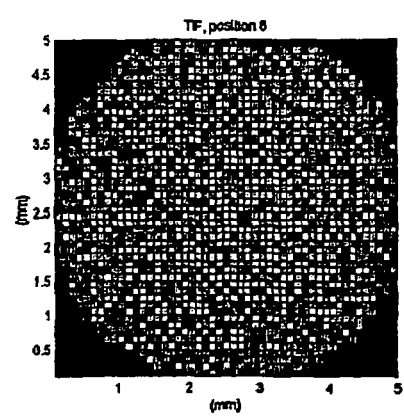
FIG. 13D is a schematic representation of the modelled intensity distribution at the output of the scintillation crystal of FIG. 12 with finite spacer thickness in response to a gamma-ray interaction site R1.

The simulations described above were repeated this time using a finite output aperture. The light output distribution at the exit window is shown in FIG. 13A and FIG. 13B for a crystal having no light-guide. FIG. 13A shows the modelled light intensity when a gamma-ray interacts at the position R8 within the crystal as indicated in FIG. 12 and FIG. 13B shows that for a gamma-ray which interacts at position R1. FIG. 13C and FIG. 13D show the distributions corresponding to the same modelled interaction sites but with a light guide 1213 of diameter d/2. It is clear that the light distribution at the exit window is far less sensitive to the interaction position when a light-guide 1213 is used.

Using this model, predictions were made of both the light-collection efficiency, the variations in the centroid of the light-pool, and the variance of the light distribution about this centroid, for different light-guide lengths. The length m of the light-guide was varied from d/2 to 8d. It was found that with any length of light-guide, the variance changed with interaction position by <1%. Similarly, the centroid position changed by <3% for all interaction positions. The change in the variance in the light pool with interaction position, decreased slowly as the light-guide length was increased. This was ~2% for a l/2 length of guide to <0.5% with a 8d length. In all cases, it is very much less than when no light-guide is used (~21%).

Figure 14:
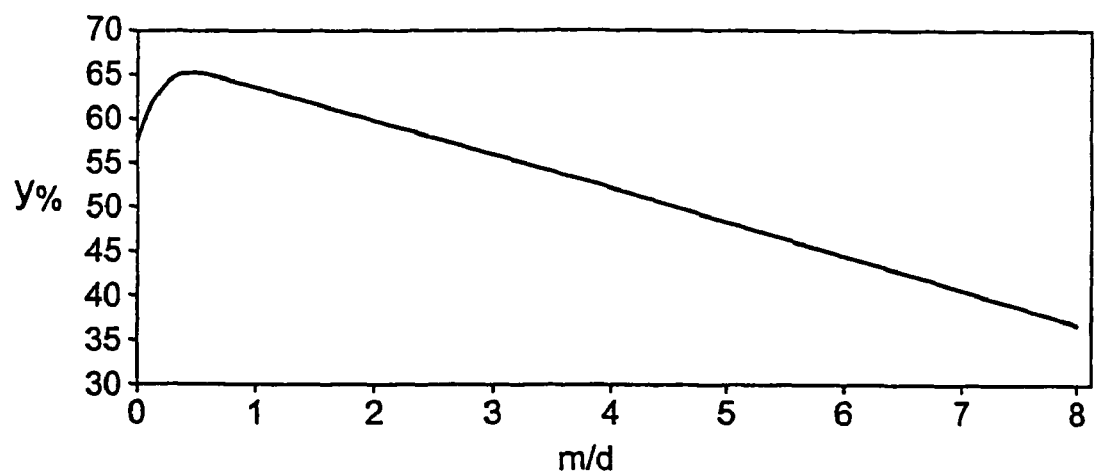
FIG. 14 is a graph showing the fraction of generated light which is transferred to the exit window of a scintillation spectrometer of the type shown in FIG. 12 as a function of the length of the light guide.

However, the total light output at the exit window does change significantly with light guide length. FIG. 14 is a graph which plots the percentage fractional yield y of the total generated Light which reaches the exit window as a function of light-guide length m relative to the crystal diameter d. The most effective design would incorporate a light-guide having a length of between d/2 and d. It will be understood that the scintillation crystal considered is cylindrical, thus having a cross-sectional diameter. Other shapes of scintillation crystal, such as hexagonal, square etc could be used. The above references to diameter of the scintillation crystal will therefore be understood more generally to apply to a width of a scintillation crystal, where width will usually be a dimension measured generally parallel to the surface plane of the photodetector.

Figure 15:
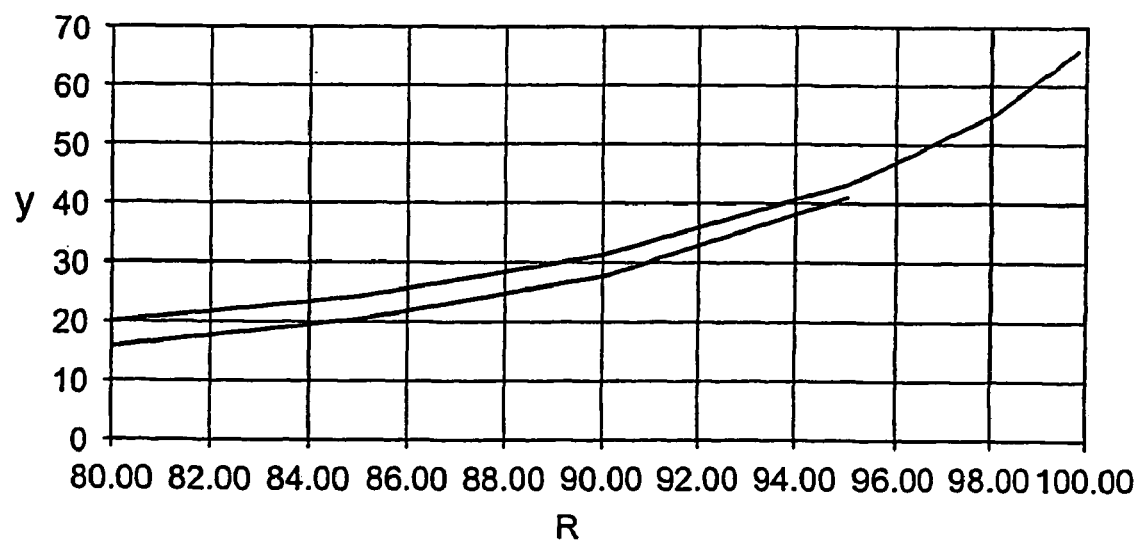
FIG. 15 is a graph showing the fraction of generated light which is transferred to the exit window of a scintillation spectrometer of the type shown in FIG. 12 for two different gamma-ray interaction sites as a function of the internal surface reflectivity.

The effect of using coatings having different reflectivity was also studied. The crystal was coupled to a light-guide whose length was equal to that of the crystal. FIG. 15 is a graph which shows how the light-collection efficiency y, as defined above, decreases as the reflectivity R decreases for interactions occurring at the sites labelled R1 and R8 in FIG. 12. Additionally, the sensitivity of the light output to the gamma-ray interaction position also increased to ~3% at 80% reflectivity.

The simulations showed that by using a light guide (>d/2), coupled to a cylindrical crystal (diameter d), the light output is far less sensitive to the position of the gamma-ray interaction than when no light-guide is used. By using only a short light-guide, the light-collection efficiency is only marginally affected provided that the crystal and light-guide are polished and packed in an efficient diffuse reflector. In certain situations, there may be a need to make a trade-off between the cost of producing such a reflective coating and its performance. It is therefore, predicted that the use of a short light-guide between any prismatic scintillation crystal and its associated photo-detector, will be an effective way by which to reduce the variance in the light-collection efficiency in a gamma-ray spectrometer.

Figure 16:
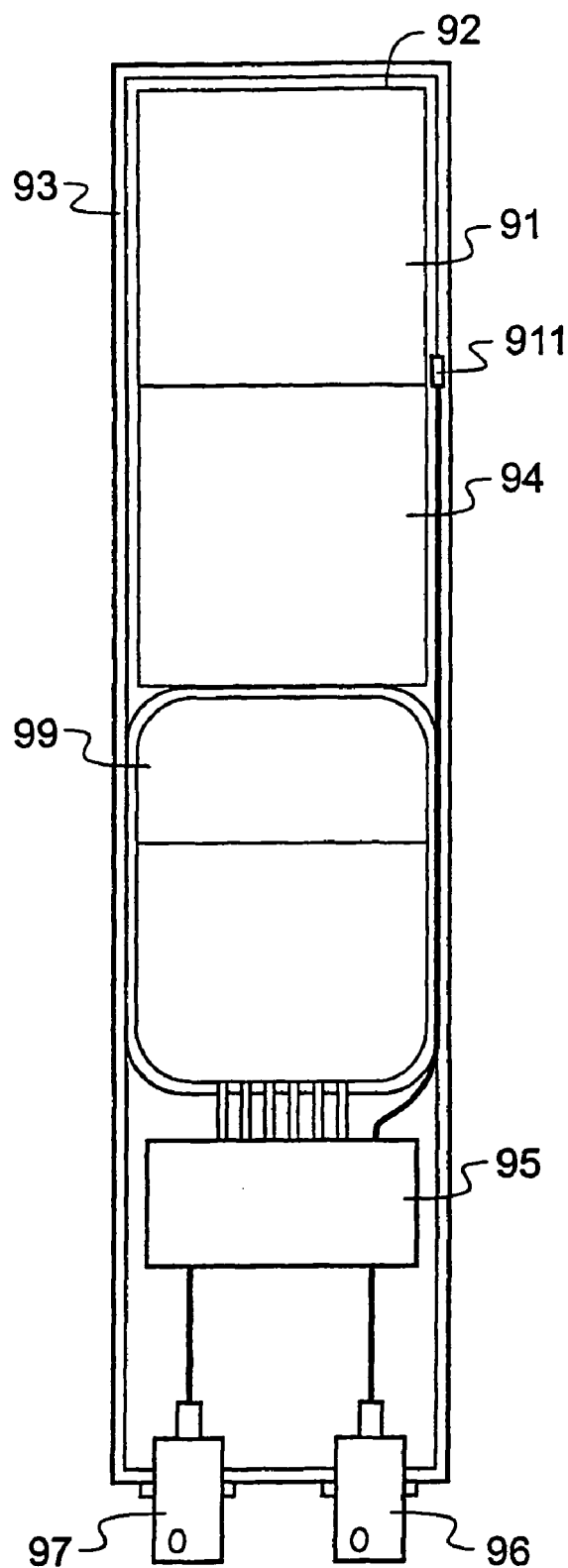
FIG. 16 is a schematic section view of a third example of a scintillation spectrometer according to a second embodiment of the present invention.

FIG. 16 shows a scintillation spectrometer according to the second embodiment. The device comprises a conventional 78 mm (3 inch) diameter cylindrical scintillation crystal 91 arranged with its upper end face adjacent to a window 92 and its lower end face abutting a non-scintillating transparent spacer 94 in the form of a quartz light guide which is in turn arranged upon a 78 mm (3 inch) diameter PMT 99 engaged in a socket 95 electrically connected by connection leads to a HV power supply connector 96 and a signal output connection 96. A temperature sensor 911 in the form of a thermistor is also provided. The temperature sensor 911 is arranged close to the scintillation crystal 91 and connected by an electric connection to the signal output connection 96 to provide a temperature signal. These components are housed in a hermetically sealed unit 93 in the form of a light-tight, moisture-proof aluminium case.

The temperature signal is supplied to the signal collection electronics and recorded with as one or more temperature data with the spectral data. During the spectrum processing it is possible to compensate for temperature changes in the scintillation crystal. A calibration file to relate the output signal from such a sensor to the ambient temperature is included in the software provided with the spectrometer. This enables temperature changes to be compensated for during the spectrum-deconvolution process. A similar arrangement can be used for the first embodiment, or the third embodiment described further below.

In the scintillation prism spectrometer, the scintillation crystal 91 is fabricated to form a prism having either a circular, square or hexagonal cross-section. These particular cross-sections enable one to construct detectors using one of the standard range of photo-multipliers that have entrance windows to match those shapes. This design enables one to construct large arrays of spectrometers in which the individual elements are closely tessellated. However, the particular cross-section chosen, is not vitally important. The length of the prism and choice of scintillation material must be chosen to suit the particular application. For example, for use up to 3 MeV when the source of illumination is on-axis, the length of a 78 mm (3 inch) diameter NaI(Tl) crystal would need to be around 78 mm (3 inch). In this case, the optimum length of light guide would be between 39 and 78 mm (1.5 and 3 inches). In certain circumstances in which the photo-cathode uniformity is poorer, a longer light-guide may be used without significant loss in performance.

The scintillation crystal should be packed in a highly reflecting material, such as MgO powder or PTFE. Alternatively, other materials, for example in paper or sheet form can be used. The scintillation crystal is coupled to the full sensitive area of the photo-multiplier via the polished quartz light-guide 94 which has the same cross-section as the scintillation crystal 91 and PMT 99. Although total internal reflection at the surface of this component is effective for this purpose, the highly reflecting packing material 92 extends from the scintillation crystal 91 to the PMT 99. The light-guide 94 is coupled to the entrance window of the PMT 99 using an appropriate optical glue.

3. Third Embodiment

The principles established during the development of both the scintillation sphere spectrometer and the scintillation prism spectrometer have also been applied to the design of new high-performance position-sensitive scintillation counters. These are arrays of miniature scintillation spectrometers each having a cross-sectional area of, for example, 3×3 mm which are viewed either by discrete PIN diodes or APDs, or a monolithic array of such photo-detectors. Alternatively, a position-sensitive photo-detector having a very uniform photo-cathode response such as a hybrid-photo-diode (HPD) or an electron-bombarded charged coupled device (CCD), would provide a uniform spatial response.

In such an application, the variances in the light-collection efficiency can be reduced by making the reflectivity of the crystal surface is as high as possible. The variance can be further reduced by designing the scintillation crystals in such a way that their length is longer than needed to stop, i.e. absorb, the gamma rays of interest. The scintillation crystal elements are made preferably at least twice, typically three times, longer than the attenuation-length of the incoming gamma radiation in the crystal. This design choice is counter-intuitive. The aim is to be able to design a detection system whose response characteristics are consistent and can be modelled reliably. This then permits the user to apply the spectral deconvolution technique outlined above in order to obtain an unprecedented improvement in the spectral-resolution.

To quantify the lengths of scintillation material needed, the attenuation length of gamma-rays of three different energies is tabulated below for several different scintillation crystals.

| Scintillation material | Atten. length at 60 keV (mm) | Atten. length at 140 keV (mm) | Atten. length at 511 keV (mm) |
| --- | --- | --- | --- |
| CsI | 0.28 | 2.8 | 24.4 |
| NaI | 0.43 | 4.1 | 31.2 |
| LSO | 0.60 | 1.1 | 12.2 |
| YAP | 0.98 | 7.0 | 22.4 |

It will be understood that data for other gamma-ray energies and other scintillation materials are well known in the art, or readily obtainable through standard experiments.

One particular application of this technology is in nuclear medicine. In this field, the most commonly used radioisotope Tc-99, generates gamma-ray photons having an energy of 140 keV. At present, the most widely used detector technology makes use of rectangular pillars of CsI(Tl) machined from a block of scintillation material. The gaps between these pillars are filled using a white epoxy material to act as a diffuse reflector for the scintillation light. This design results in there being a wide range of signal amplitudes when the 140 keV photons are detected by the crystal array. This is because the photons interact throughout the entire depth of the pillar. Since the reflectivity of the white epoxy is relatively poor, a wide range of signal amplitudes is generated by incident photons that have the same energy. This naturally degrades the spectral-resolution of this position-sensitive detector. Frequently, this effect is compounded by its use with a photo-detector in which the photo-cathode response varies widely across its sensitive area. We have demonstrated that improved spectra can in fact be acquired by:

- Making the crystal pillars longer than is necessary for the efficient detection of the gamma rays.
- Improving the reflectivity of the material used between the crystal elements. The key factor is that the 'roll-off' in the light-collection efficiency along the length of such a small scintillation crystal should be large compared with the range of depths over which the gamma-ray interactions occur.
- Using a detector having a uniform response across the entire detection plane.

A number of measurements have been made using both commercially-available crystal arrays and individual crystal elements. These were fabricated, finished and packed in such a way as to minimise the roll-off in the signal generated as a function of distance of the point of interaction along the crystal element.

A high-performance, position-sensitive scintillation counter can be designed and fabricated in such a way that its performance can be modelled accurately so as to enable the energy-loss spectra to be processed to yield a more accurate measurement of the incident gamma-ray spectrum.

FIG. 17A shows a detection plane according to the third embodiment in which the scintillation crystal has been machined into a two-dimensional array of pillar-shaped elements 101a. The individual crystal elements 101a have a cross-section of, for example, 3×3 mm and are packed in a highly reflective material 102a. The crystal elements 101a are made longer than necessary to stop the incident gamma rays of interest. More specifically, they are sufficiently long so as to provide a light-attenuation length in the crystal, between the location of the gamma ray interaction and the photo-detector, that is large compared with the attenuation length of the incident gamma rays in the crystal elements. These crystal elements need to be manufactured and finished carefully in order to ensure that they behave in a consistent manner. This is important for the success of the spectral deconvolution software, since the same model will be used for all of these individual detection elements.

The choice of photo-detector is limited since it is important that the variation in the quantum efficiency across the detection plane is uniform. This is necessary to ensure that a single model can be used to describe the energy-response function of all the elements in the array. One possibility is an array of discrete PIN diodes or, preferably, a monolithic array of such devices 103a.

FIG. 17B further details an individual detection cell from the array of detection cells shown in FIG. 17A. In addition to the scintillation crystal 101b, the packing 102b and the detector 102c, a schematic representation of a gamma-ray interaction 104b is also shown.

FIG. 17C is a schematic representation of a second example of this embodiment of the invention. The scintillator crystal array 101c will be understood from the above discussion. However in this exemplary embodiment the detector 104c is a multi-pixel hybrid photo-diode or an electron-bombarded CCD detector that has been fabricated in a similar way using a transfer photo-cathode technology.

Whilst the very real benefits of improving the spectral-resolution and the sensitivity of scintillation spectrometers has been demonstrated through the application of careful modelling and deconvolution techniques, the practical application of this technology will be greatly assisted by carrying out the spectrum-processing task in near real-time, whilst the energy-loss spectrum is being accumulated. By using either a fast PC (>1 GHz) or a custom-designed fast DSP/FPGA processor, the computed gamma ray spectrum, incident on the detector, can be displayed and up-dated within an interval of less than a few seconds. The processing time is a function of the number of energy-channels required in the gamma ray spectrum and, in the case of the spectral imager, on the number of pixels in the detector. In the latter case, the number of energy-channels required in many medical imaging applications is modest but the number of pixels might typically be ~1000.

4. Applications

4.1 Environmental Radiation Measurements

4.1.1 Field Measurements

In order to determine the level of radioactive contamination present in, for example a 'brown-field' land-site, samples of soil must be collected from a large number of locations across the site for later assay by a laboratory-based HPGe spectrometer system. This is inevitably an expensive and slow process. We believe that in view of the high sensitivity, good energy-resolution and ruggedness of the new scintillation spectrometer designs described here, many of these tasks could be carried out more cost-effectively on-site. This may be achieved either by mounting the spectrometer 111a in a shielded enclosure 112a that has a well-defined aperture to define the area of soil to be surveyed as schematically indicated in FIG. 18A. Alternatively, samples can be placed inside a Marinelli beaker 113b so that the sample 114b surrounds the spectrometer 111b on all but one side as schematically indicated in FIG. 18B.

4.1.2 Airborne Measurements

The spread of radioactive contaminants from industrial plants concerned with the use or reprocessing of nuclear materials, can be mapped using large-volume scintillation spectrometers carried either by a light aircraft or a helicopter. The volume of such spectrometers is typically 3000–5000 cc. Several of these detectors are used to provide sufficient sensitivity to map large areas of the terrain around the plant with a resolution of a few hundred metres. We propose that the sensitivity of such measurements to measure the activity of particular radioisotopes, remotely, could be increased, within the current payload limits, by using an array of smaller scintillation sphere spectrometers. Furthermore, the use of an array of such detectors 121 in conjunction with a coded-aperture mask 122, that could be located a metre or so below the detection plane, as indicated in FIG. 19 could also improve the spatial resolution of the radioactivity map by providing an image of the 'scene' beneath the aircraft. The improvement in spatial-resolution in the map of radioactivity generated by such a survey may be expected to be more than an order of magnitude better than using existing techniques.

4.1.3 Effluent Monitoring Systems

Figure 20:
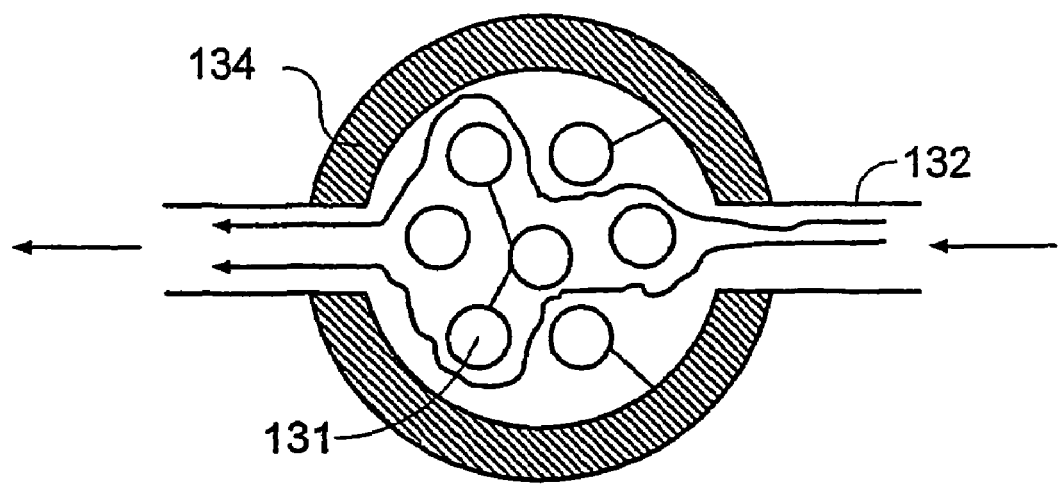
FIG. 20 is a schematic section of a first example of a third application of an embodiment of the invention.

Strict controls are placed on the total level of activity of specific radioisotopes that may be discharged into the environment through the aqueous effluent from nuclear installations. FIG. 20 shows a cluster of scintillation sphere spectrometer or scintillation prism spectrometer spectrometers 131 placed in line with the discharge pipe 132 to measure integrated activity discharge and also to raise an alarm when the instantaneous activity level exceeds a pre-set threshold. The sensitivity of the system may be adjusted to suit the specific requirements by increasing, or decreasing, the number of spectrometers used in the monitoring system. A shield 134 is provided to reduce the effects of other background radiation on the measurements.

4.1.4 Leak Detection in Cooling Systems in Nuclear Power Plant

It is important to maintain a constant check on the 'health' of the fuel elements in a nuclear reactor. Excessive local heating, corrosion, or faults in the manufacture of a fuel-element, can lead to leaks in the sealed can that encloses the fuel. A spectrometer may be included in the cooling circuit in order to detect promptly, any sign of the specific fission products that have been generated within the fuel elements. Some have used HPGe spectrometers for this purpose. However, we propose that the high spectral-resolution, sensitivity and ruggedness of a scintillation spectrometer according to any one of the embodiments of the invention would provide a more sensitive and reliable safety system. The system required would be very similar to that discussed above and shown in FIG. 20.

4.2 Minerals Analysis using Neutron Activation Methods

4.2.1 Real-time Minerals Analysis

Figure 21:
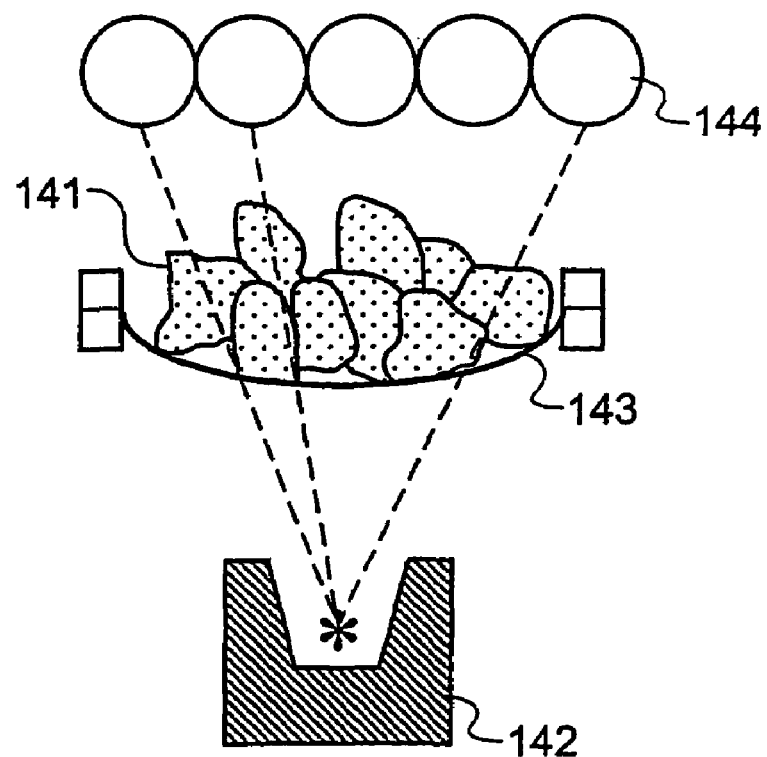
FIG. 21 is a schematic section of a first example of a fourth application of an embodiment of the invention.

FIG. 21 is a schematic representation of an apparatus to measure the elemental composition of crushed rock 141. This can be determined in real-time by irradiating it as it is carried over a collimated neutron source 142, on a conveyor belt 143. The neutrons stimulate the emission of gamma rays that are characteristic of each element in the rock either by inelastic scattering, or following the absorption of thermal neutrons by the different nuclei present in the rock sample. Either a single detector, or an array of detectors 144 placed above the conveyor belt, need to be able to stop these energetic gamma rays (~1–10 MeV), efficiently. These detectors also should have a good enough spectral-resolution to clearly resolve the energies of the multiple gamma-ray lines that are generated by neutron activation in order to provide an unambiguous analysis of the rock. The use of a scintillation spectrometer according to any one of the embodiments of the invention in this application would provide a marked improvement in the quality of the data obtained.

4.2.2 Control of the Elemental Composition of Cement

Cement is manufactured from a blend of limestone and clay along with the addition of a number of other materials in smaller quantities. Before these materials are finally milled and fired in a kiln, it is important to verify that they are present in the correct proportions. This may be achieved by using a similar neutron activation process to that described above and indicated in FIG. 21 in which the conveyor belt carries the blend of raw materials to make cement, as it is passed over the neutron source. The spectrometer requirements are essentially the same as for the analysis of crushed rock.

4.2.3 Real-time Measurement of the Calorific Content of Coal

Large-scale consumers of coal, such as electricity generators, are very interested in quantifying the calorific content of the coal as it is transferred to the boiler. This may be measured, again using a neutron-activation technique, so that only the tonnage of carbon, rather than the ash content, is paid for. This technique can also be used to quantify the sulphur content of the fuel. Whilst many operators demand a real-time analysis of the coal as it is transferred to the furnace, others are happy to make these measurements on samples, in batch-mode. The principle of the technique is again similar to that outlined in section above. However, it is necessary to optimise the neutron source-strength and the sensitivity of the spectrometer array to suit the needs of each particular installation. The same technique could also be applied to other hydrocarbon fuels such as shale oil or oil.

4.3 Security Applications

4.3.1 Detection of Contraband Radioactive Materials

Figure 22:
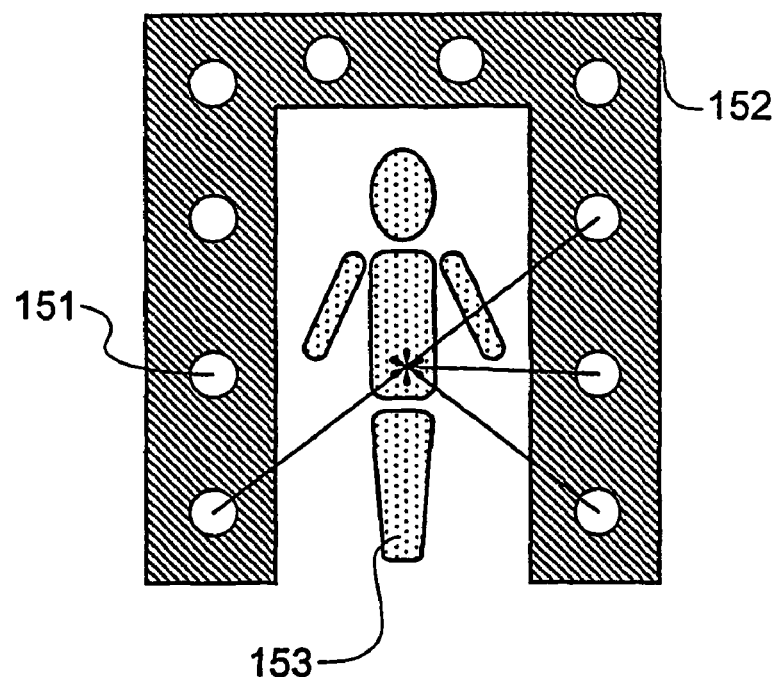
FIG. 22 is a schematic section of a first example of a fifth application of an embodiment of the invention.

It is of great importance in restricting the proliferation of nuclear weapons, to maintain a close watch on the transfer of fissile materials out of nuclear installations and across national frontiers. FIG. 22 shows one or more scintillation sphere spectrometer or scintillation prism spectrometer-spectrometers 151 mounted within a standard 'metal-detection' archway 152 such as are commonly used to c airports. Such an arrangement would be very effective in detecting small quantities of radioactive materials carried by a passenger 153. A similar spectrometer system could be used to detect such materials concealed in a passenger's baggage.

Figure 23:
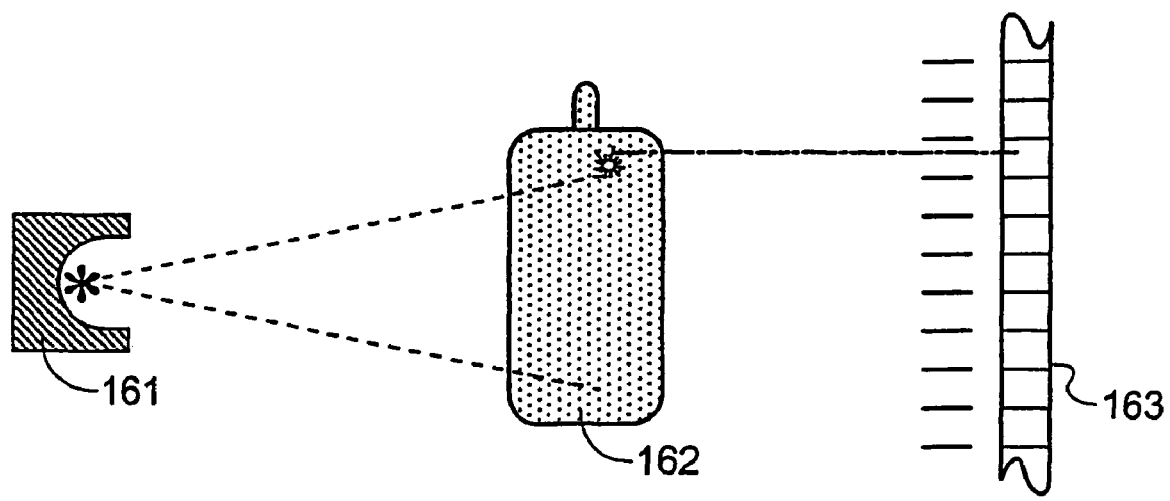
FIG. 23 is a schematic section of a first example of a sixth application of an embodiment of the invention.

4.3.2 Detection and Imaging of Contraband Materials Using Neutron Activation Methods The presence of contraband materials in a passenger's luggage 162 or even in a large shipping-container, could be detected by illuminating the object by a collimated neutron source 161 as shown in FIG. 23. The contraband materials may then be detected by searching the observed gamma ray spectra for the particular combinations of gamma ray line-features expected from a number of specific explosives or other contraband materials, such as narcotics. These features would need to be present in the correct ratios within a particular volume within the region illuminated by the neutron beam, in order to flag the presence of potential threat material. One could define the particular volumes of interest in such a search by using a collimated spectrometer 163. However, an alternative configuration for use in an imaging system based on the characteristics of a coded-aperture, has been described in reference [4]. Although that proposal envisaged the use of an array of small spectrometers based on the use of simple CsI(Tl)-photodiode scintillation counters, the performance, sensitivity and specificity of the spectral imager would be greatly improved by the use of a scintillation spectrometer according to any one of the embodiments of the invention.

4.3.3 The Detection of Buried Landmines

The elements that are commonly present in explosive materials, generate high-energy gamma-rays in the range 2–11 MeV, when irradiated by a neutron source. In particular, explosives are nitrogen-rich whereas most soils have a low concentration of nitrogen. One might therefore expect that hidden mines might be detected by illuminating a region of the ground using a strong neutron source and using a collimated scintillation sphere spectrometer to record the activated gamma-ray spectrum. Alternatively, the region could be imaged using a coded-aperture mask in conjunction with an array of scintillation prism spectrometers, in order to provide a better signal to noise ratio.

4.3.4 The Detection and Imaging of Contraband Materials using Multi-energy Gamma-ray Computed Tomography (MEGA-CT)

Figure 24:
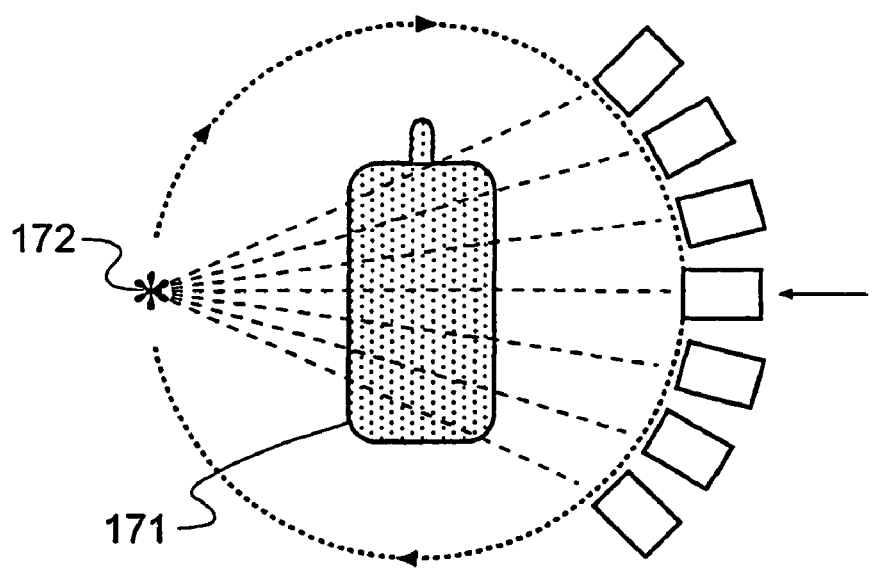
FIG. 24 is a schematic section of a first example of a seventh application of an embodiment of the invention.

In the system shown in FIG. 24, an object, for example a passenger's suitcase 171, is illuminated by a radioactive source 172 that produces multiple gamma-ray lines, such as Ba-133. The attenuation of each photon-energy can be measured along a large number of paths through the object to be imaged from the source to an array of scintillation prism spectrometers 173. If the source and the detector array are rotated about the suitcase in small incremental angles, a 'density image', in three dimensions, can be reconstructed from the attenuation data. If the detection plane consists of just a linear array of elements in a single plane, then the information required to generate a 3-D image must be acquired sequentially for each slice through the object. The combination of that image and the attenuation data at each of the photon energies available from the source, can provide a reliable indication of the composition of the material present in the selected region. This data may be compared with a library of the attenuation data of materials that provide a potential threat.

4.4 Oil-well Logging

4.4.1 Near-real-time Analysis of the U/Th Ratio in the Rock Chippings Generated During the Drilling of an Oil Well.

Figure 25:
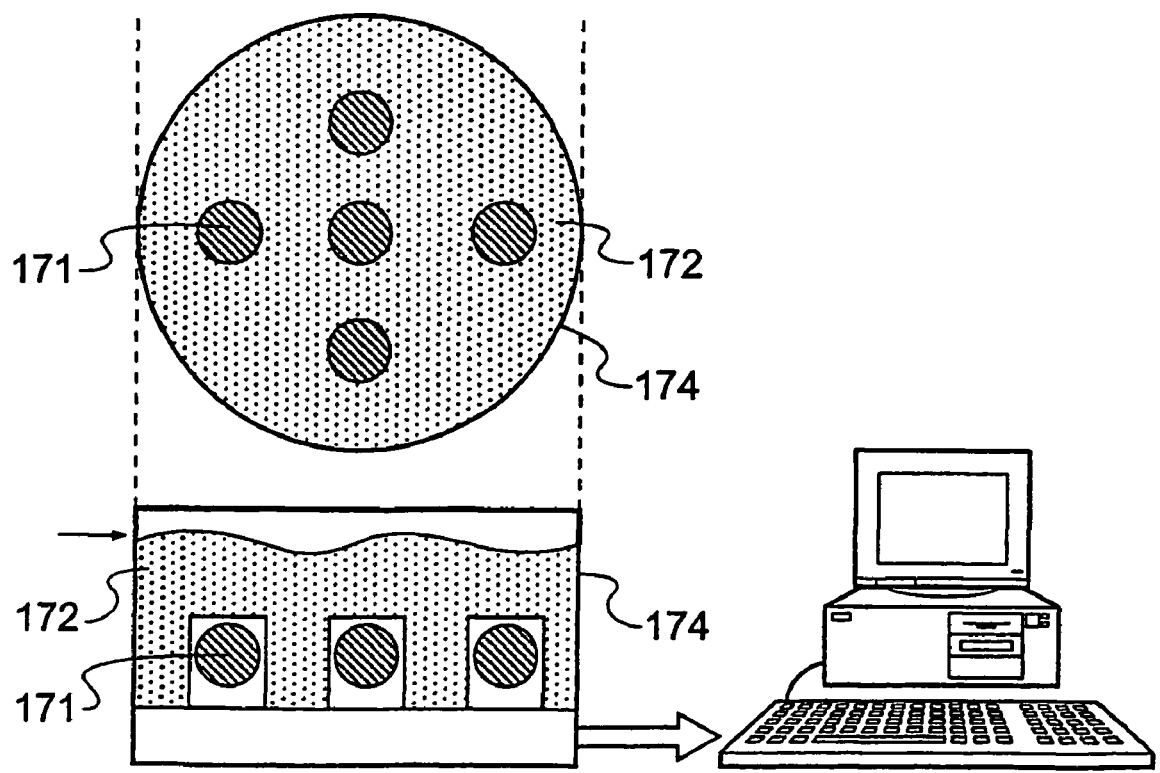
FIG. 25 is a schematic section of a first example of an eighth application of an embodiment of the invention.

The naturally-occurring radioactivity that is present in rock, includes various contributions from radioactive products in the decay chains of both uranium and thorium. In addition, potassium also has a long-lived isotope, $K^{40}$, that produces a gamma ray feature at 1460 keV. The relative ratios of these U, Th and K features, vary in different rock strata. Consequently, the measurement of the ratio of the strength of these features can be used to identify the particular strata reached whilst drilling an oil well. This is shown schematically in FIG. 25 both in vertical (upper) and horizontal (lower) section. The rock chippings 172 that are produced during the drilling process are collected and placed in a Marinelli beaker 174 equipped with multiple detector heads 171 to increase the sensitivity and speed of the measurement. The U/Th/K ratios may be determined in near real-time using such a system.

4.4.2 Rock Composition Analysis by Down-the-well Neutron Analysis.

Figure 26:
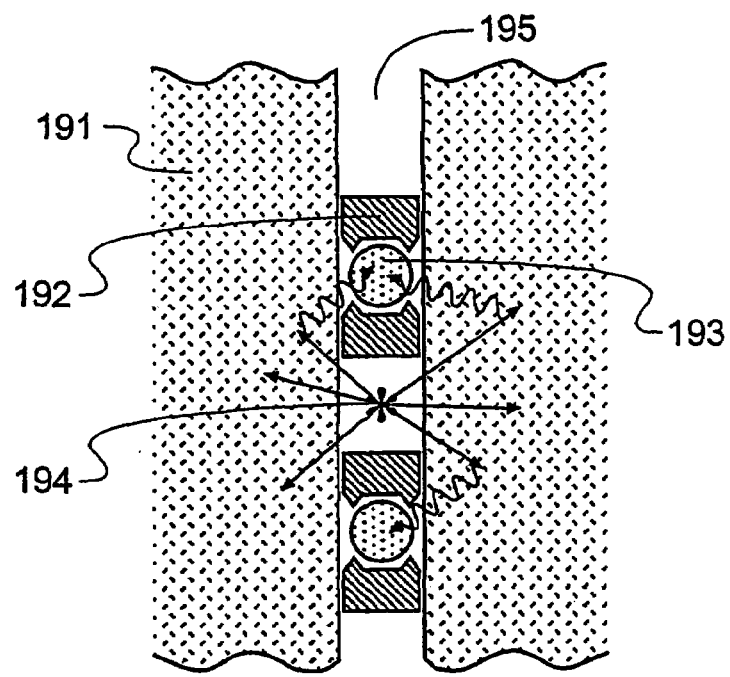
FIG. 26 is a schematic section of a first example of a ninth application of an embodiment of the invention.

FIG. 26 schematically shows a method of analysing rock composition within a well. The composition of the rock strata 191 throughout the depth of an oil-well 195, along with the hydrocarbon or moisture content can be mapped. These include the use of neutron-activation to generate gamma-ray line features that indicate the type of nuclei present in the rock, whilst the intensity of the scattered thermal neutrons, provide a measure of the amount of water or hydrocarbons present in the porous rock. The use of a scintillation spectrometer 193 according to any one of the embodiments of the invention would improve the sensitivity of such instruments and specificity of these measurements. In this case the neutron source 194 may either be a radioactive source or a pulsed D-T source that generates more energetic neutrons. Suitable shielding 192 is used to limit the field of view of the scintillation spectrometers.

4.4.3 Rock-core Analysis

Figure 27:
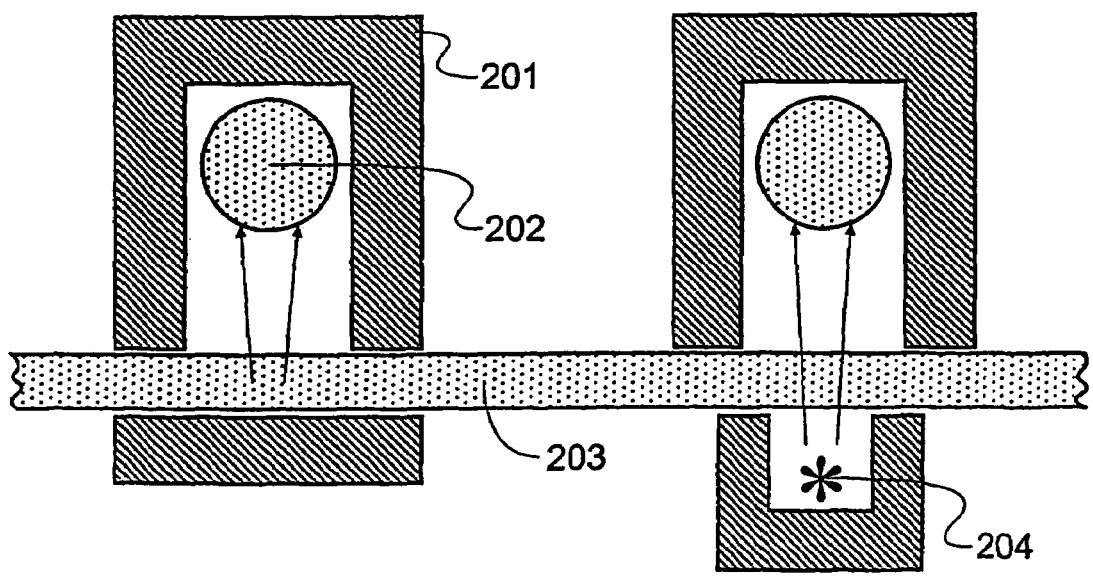
FIG. 27 is a schematic section of a first example of a tenth application of an embodiment of the invention.

FIG. 27 shows a method for rock-core analysis. A continuous cylindrical sample of the rock strata 203 that has been penetrated by the drill-bit, may be extracted from the centre of the drill tool. A record of the progress of the well may then be recorded by measuring the changes in the natural activity of these samples, and density, as a function of distance along these rock cores. The use of scintillation sphere spectrometer or scintillation prism spectrometers 202 in such instrumentation, would improve the accuracy of both the measurement of the natural radioactivity and the density of the rock sample. In both of these measurements, the scintillation spectrometer is shielded from other background radiation by a lead or tungsten collimator 201 as it is scanned along the length of the rock core. A dual-energy collimated radioactive source 204 may be used in the measurement of the rock density variations along the sample.

4.5 Medical Applications 4.5.1 Gamma-ray Probes for Radio-guided Surgery

Figure 28:
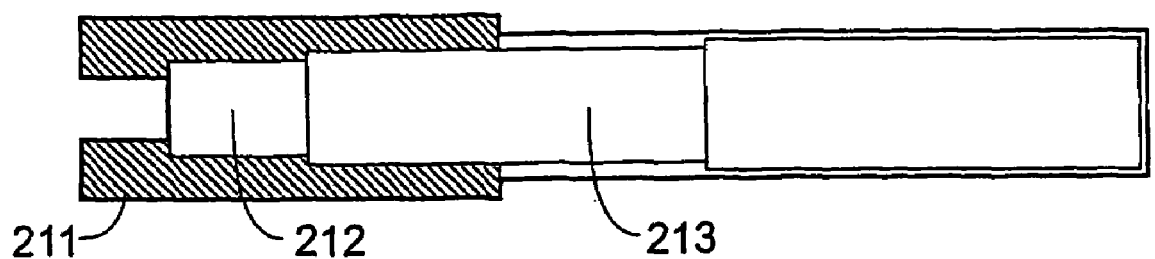
FIG. 28 is a schematic section of a first example of an eleventh application of an embodiment of the invention.

Small, collimated gamma ray spectrometers, constructed using either scintillation or room-temperature semiconductor materials, are used to guide surgeons to the location of a radioactive tracer material in a patients body. Such materials are injected to indicate the boundaries of a carcinoma to ensure that all of the affected tissue has been removed during an operation. There are also systems that are used to delineate the lymphatic system related to a particular tumour. For example, in the case of a breast tumour it is important to locate which of the nodes in the related lymphatic system, is the one most likely to be involved in the spread of the disease. These 'sentinel' lymph nodes may be identified by scanning the detector over the region likely to be involved, in order to locate the 'hot-spot' associated with the radioactive material trapped by the node. The sensitivity of such measurements depends both on the detection efficiency of the gamma ray probe and also on the spectral-resolution that it is able to provide. The spectral resolution is particularly important when attempting to locate a lymph node close to the injection site for the radioactive tracer. In such case, the high background that arises from the Compton-scattering of that radiation is very high so the probe must be highly selective in detecting the un-scattered radiation. FIG. 28 shows a small scintillation spectrometer according to any one of the embodiments of the invention. The detector 212 is coupled to a miniature photo-multiplier 213 and may be surrounded by either a lead or tungsten collimator 211, to provide high sensitivity, good spectral-resolution and good spatial-resolution.

4.5.2 Gamma-ray Imaging Systems

Figure 29:
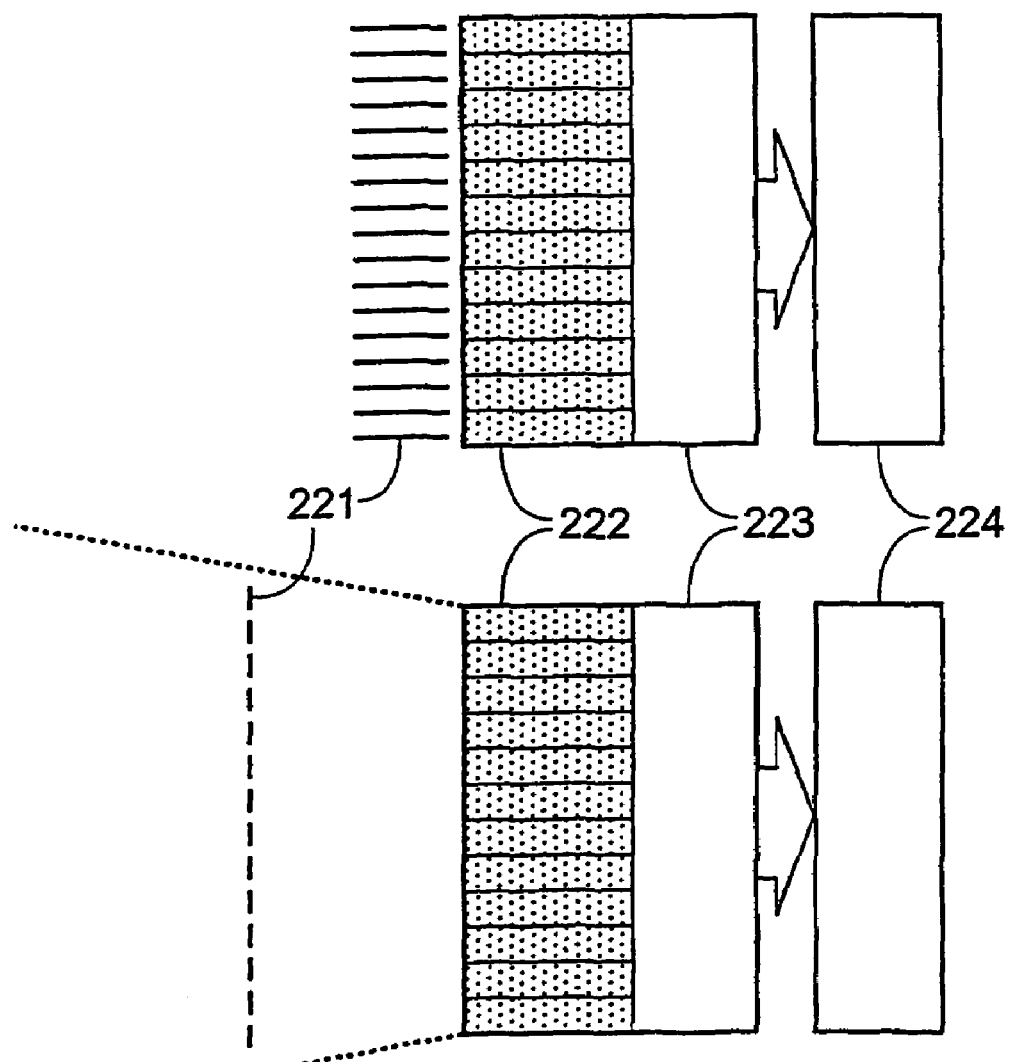
FIG. 29 is a schematic section of a first example of a twelfth application of an embodiment of the invention.

An array of small scintillation crystal elements, constructed according to the third embodiment can be used in a wide range of applications in nuclear medicine, radiology and environmental radiation imaging. Such a detection plane may be used in conjunction with a variety of image-formation processes to provide a spectral imager having a uniquely good spectral resolution. For example, when used in a gamma-camera for nuclear medicine applications, the improved spectral-resolution should reduce the background from scattered radiation very significantly. This would permit either a lower dose of activity to be administered to the patient or to enable multi-energy studies to be made using two or three isotopes simultaneously. A schematic example of such an arrangement is shown in both vertical (upper) and horizontal (lower) section in FIG. 29. The crystal array 222 may be viewed either by an array of photo-diodes, or other photo-detector having a uniform response 223. The signals from each pixel are analysed and deconvolved individually, by a fast processor 224 using the techniques outlined above to provide the improve spectral resolution. Different image formation techniques based for example on the use of a collimator or a coded-aperture mask 221 are possible.

4.6 Non-destructive Testing 4.6.1 Thickness Measurements

Figure 30:
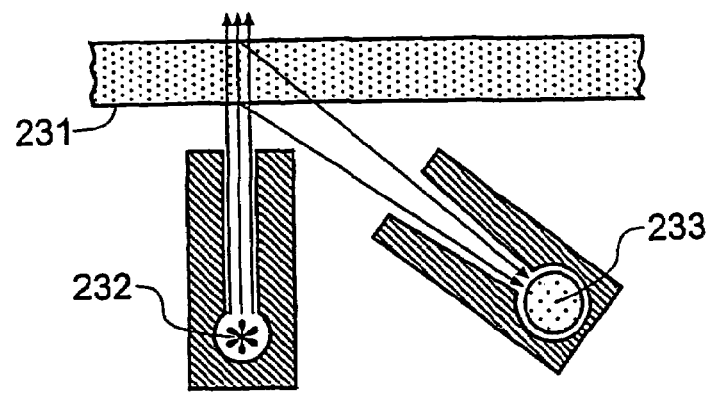
FIG. 30 is a schematic section of a first example of a thirteenth application of an embodiment of the invention.

The thickness of, for example, a steel plate 231 or pipe can, in principle, be measured by using a collimated beam of monochromatic gamma rays 232 to illuminate the object as indicated in FIG. 30. If a similarly collimated detector 233, is used to observe the region though which the gamma ray beam passes, the scattered gamma ray spectrum that is incident on this detector, can be processed to provide a measure of the thickness of the target material. The precision of this measurement depends on the energy resolution and sensitivity of the scintillation spectrometer.

4.6.2 Real-time Measurement of the Cement Content of Concrete

Figure 31:
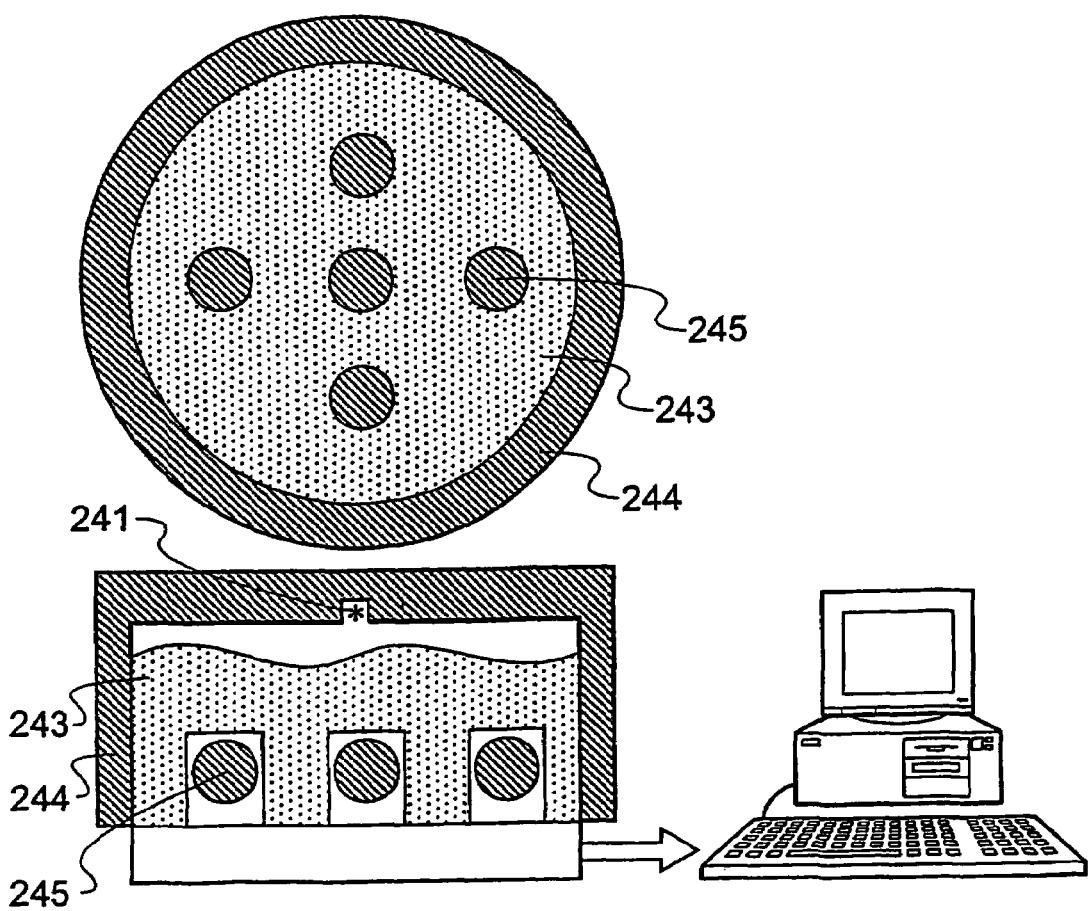
FIG. 31 is a schematic section of a first example of a fourteenth application of an embodiment of the invention.

Every mineral material has its own characteristic natural radioactivity. This long-lived radiation originates as a consequence of the geological processes that led to the formation of the various rock and clay strata since the elements was formed. This natural radioactivity is at a low level and it is necessary to use a spectrometer that has both a good energy-resolution and a high sensitivity, in order to measure the intensity and nature of the radiation generated, in a time that is practical for use on a construction site. If one can measure separately, the specific activities of the feed-stock used for the cement, sand and aggregate, it is then possible to determine the cement-content of the resulting wet concrete mix in near real-time by placing a sample of the mix in a special Marinelli beaker. Whilst it has been shown that such a measurement could in principle be made using an HPGe detector [3], the measurement-time used was of the order of 12 hours. However, by using a small open-spaced array of several scintillation sphere spectrometers or scintillation prism spectrometers 245 as indicated both in horizontal (upper) and vertical (lower) section in FIG. 31, one could provide an accurate measurement of the cement content of a wet concrete mix 243 held in a Marinelli beaker 244 on a time-scale of the order of ten minutes. The water content of this mix could also be estimated from the intensity of the deuterium gamma ray line-feature generated by the absorption of thermal neutrons by hydrogen. This measurement would require the positioning of a collimated neutron-emitting radioactive source 241, such as Cf-252, above the sample of concrete.

5. REFERENCES

1. L. J. Meng, D. Ramsden, *Inter-comparison of three algorithm for gamma-ray spectrum deconvolution* IEEE Transactions on Nuclear Science, volume 47, pages 1011–1117
2. B D Rooney and J D Valentine, *Scintillation light-yield non-proportionality: Calculating photon response using measured electron response*. IEEE Trans Nuclear Science, volume 44, pp 190 (1997)
3. C G Rowbottom, W. B. Gilboy and D. J. Hannant, "Determination of cement content of cement blends using Gamma-ray spectroscopy", Cement and Concrete Research, Vol. 27, No. 11, pages 1681–1690 (1997)
4. R J Evans, I D Jupp, F Lei, D Ramsden, *Design of a large-area CsI(Tl) photo-diode array for explosives detection by neutron-activation gamma ray spectroscopy* Nuclear Instr and Methods A, volume 422 (1999), pp 900

The contents of these references are incorporated herein by reference in their entirety.

The invention claimed is:

1. A system, comprising:
    a gamma-ray spectrometer, including:
        a scintillation body for receiving gamma-rays and creating photons therefrom;
        a photon detector having a sensitive area facing the scintillation body so as to receive and detect the photons; and
    a processor operable to process energy loss data obtained by the gamma-ray spectrometer by deconvolution using a response function for the gamma-ray spectrometer.

2. The system according to claim 1, wherein the scintillation body has a surface that that is partially curved, and wherein the sensitive area of the photon detector is arranged tangentially to the curved portion of the surface.

3. The system according to claim 2, wherein the scintillation body comprises a generally spherical shape.

4. The system according to claim 1, wherein the photon detector is separated from the scintillation body by a light guiding spacer.

5. The system according to claim 1, wherein the photon detector is based on a semiconductor element.

6. The system according to claim 1, wherein the photon detector comprises a diode selected from a group consisting of (i) a PIN diode, (ii) a drift diode, (iii) a hybrid photodiode, and (iv) an avalanche photodiode.

7. The system according to claim 1, wherein the photon detector comprises a photo-multiplier tube.

8. The system according to claim 1, wherein the scintillation body is packed in a reflective material.

9. The system according to claim 1, further comprising a temperature sensor for measuring the temperature of the scintillation body.

10. A system, comprising:
    a gamma-ray spectrometer, comprising:
        means for absorbing gamma-rays and creating photons; and
        a photon detector arranged to receive and detect photons; and
    a processor operable to process energy loss data obtained by the gamma-ray spectrometer by deconvolution using a response function for the gamma-ray spectrometer.

11. The system according to claim 10, further including a light guiding spacer for spreading the photons so that an intensity profile of the photons across the photon detector is substantially uniform, and a length of the light guiding spacer is between 0.5–10 times a corresponding width of the means for absorbing gamma-rays and creating photons.

12. The system according to claim 11, wherein the light-guiding spacer is packed in a reflective material.

13. A system according to claim 10, further comprising a temperature sensor for measuring a temperature of the means for absorbing gamma-rays and creating photons.

14. A system, comprising:
    a gamma-ray spectrometer comprising a scintillation body for absorbing gamma-rays within the scintillation body and creating photons therefrom, and means for receiving and detecting the photons; and
    a processor operable to process energy loss data obtained by the gamma-ray spectrometer by deconvolution using a response function for the gamma-ray spectrometer.

15. The system according to claim 14, wherein the scintillation body comprises Cesium Iodide.

16. The system according to claim 14, wherein the scintillation body comprises Sodium Iodide.

17. The system according to claim 14, wherein the scintillation body comprises Lutetium Oxyorthosilicate.

18. The system according to claim 14, wherein the scintillation body comprises Yttrium Aluminum Perovskite.

19. The system according to claim 14, wherein the scintillation body comprises an array of pillars.

20. The system according to claim 19, wherein the pillars are laterally isolated from each other with reflective material.

21. The system according to claim 20, wherein the means for receiving and detecting the photons comprises an array of detection elements.

22. The system according to claim 21, wherein the array of detection elements comprises a diode selected from a group consisting of (i) an array of discrete photodiodes, (ii) a monolithic array of photodiodes, (iii) a multi-pixel hybrid photodiode, and (iv) an electron-bombarded charged coupled detector.

23. The system according to claim 21, further comprising a coded-aperture mask arranged before the scintillation body to allow for imaging across the array of detection elements.

24. The system according to claim 21, further comprising a collimator arranged before the scintillation body to allow for imaging across the array of detection elements.

25. The system according to claim 21, further comprising a pin hole arranged before the scintillation body to allow for imaging across the array of detection elements.

26. The system according to claim 14, further comprising a temperature sensor for measuring a temperature of the scintillation body.

27. A method of gamma-ray spectroscopy, comprising the steps of:
    (a) providing an object to be analyzed based on gamma rays;
    (b) collecting energy-loss data for the object provided in said step (a) with a gamma-ray spectrometer comprising a scintillation body for receiving gamma-rays and creating photons therefrom, and a photon detector having a sensitive area facing the scintillation body so as to receive and detect the photons; and
    (c) processing the energy-loss data collected in said step (b) by deconvolution using a response function computed for the gamma-ray spectrometer.

28. The method according to claim 27, wherein the energy loss-data collected in said step (b) is collected with temperature data indicating the temperature of the scintillation body, and the processing in said step (c) compensates the energy-loss data in respect of temperature using the temperature data.

29. The method according to claim 27, wherein the sensitive area of the photon detector is not more than 10% of a surface area of the scintillation body.

30. A method of gamma-ray spectroscopy, comprising:
(a) providing an object to be analyzed based on gamma rays of at. least a first energy;
(b) collecting energy-loss data for the object provided in said step (a) with a gamma-ray spectrometer comprising a scintillation body for absorbing the gamma-rays and creating photons therefrom, and a photon detector arranged to receive and detect the photons; and
(c) processing the energy-loss data collected in said step (b) by deconvolution using a response function computed for the gamma-ray spectrometer.

31. The method according to claim 30, wherein the energy loss-data collected in said step (b) contains temperature data indicating a temperature of the scintillation body, and the processing in said step (c) compensates the energy-loss data in respect of temperature using the temperature data.

32. The method according to claim 30, wherein the scintillation body is dimensioned to have a length of at least twice an attenuation length of gamma rays in order to spread the photons so that they more uniformly illuminate the photon detector.

* * * * *